(12) United States Patent
Oh

(10) Patent No.: US 12,307,356 B2
(45) Date of Patent: *May 20, 2025

(54) NEURAL PROCESSING DEVICE

(71) Applicant: Rebellions Inc., Seongnam-si (KR)

(72) Inventor: Jinwook Oh, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,958

(22) Filed: Feb. 14, 2024

(65) Prior Publication Data

US 2024/0185045 A1 Jun. 6, 2024

Related U.S. Application Data

(63) Continuation of application No. 18/184,543, filed on Mar. 15, 2023, now Pat. No. 11,934,942.

(30) Foreign Application Priority Data

| Mar. 15, 2022 | (KR) | .................. 10-2022-0031884 |
| Mar. 15, 2022 | (KR) | .................. 10-2022-0031888 |
| Mar. 15, 2022 | (KR) | .................. 10-2022-0031890 |

(51) Int. Cl.
*G06N 3/06* (2006.01)
*G06F 9/50* (2006.01)
(Continued)

(52) U.S. Cl.
CPC ............ *G06N 3/063* (2013.01); *G06F 9/5011* (2013.01); *G06F 13/14* (2013.01); *G06F 2209/501* (2013.01); *G06F 2209/508* (2013.01)

(58) Field of Classification Search
CPC ....... G06N 3/063; G06F 9/30014; G06F 7/57; G06F 9/30109; G06F 7/49947; G06F 9/30185
See application file for complete search history.

(56) References Cited

U.S. PATENT DOCUMENTS 8,281,265 B2 * 10/2012 Vorbach .............. G06F 15/7867
716/128
8,726,250 B2 * 5/2014 Vorbach .............. G06F 15/7867
717/136
(Continued)

FOREIGN PATENT DOCUMENTS

| KR | 10-2019-0104406 A | 9/2019 |
| KR | 10-2258566 B1 | 6/2021 |
| KR | 10-2022-0027434 A | 3/2022 |

OTHER PUBLICATIONS

Jain et al., "Efficient Execution of Quantized Deep Learning Models: A Compiler Approach", Jun. 18, 2020; ArXiv, pp. 1-12 (Year: 2020).*

(Continued)

*Primary Examiner* — Paulinho E Smith
(74) *Attorney, Agent, or Firm* — BROADVIEW IP LAW, PC

(57) ABSTRACT

A neural processing device is provided. The neural processing device includes a plurality of processing engine groups, a first memory shared by the plurality of engine groups, a first interconnection configured to transmit data between the first memory and the plurality of processing engine groups. The neural processing device is configured to provide hardware resource to the plurality of processing engine groups. At least one of the plurality of processing engine groups includes a plurality of processing engines, each of the plurality of processing engines includes an array of a plurality of processing elements interconnected by a mesh style network, the processing elements being reconfigurable. The neural processing device includes a second memory shared by the plurality of processing engines, and a second interconnection configured to transmit data between the second memory and the plurality of processing engines.

19 Claims, 33 Drawing Sheets

(51) Int. Cl.
    *G06F 13/14*     (2006.01)
    *G06N 3/063*     (2023.01)

(56) References Cited

U.S. PATENT DOCUMENTS

| | | |
|---|---|---|
| 11,200,096 B1 | 12/2021 | Shenbagam et al. |
| 11,593,658 B2 | 2/2023 | Liu et al. |
| 11,650,793 B2 * | 5/2023 | Oh .................. G06F 7/5443 |
| | | 708/523 |
| 11,657,261 B1 * | 5/2023 | Oh .................. G06N 3/063 |
| | | 706/27 |
| 2014/0137123 A1 | 5/2014 | Hartmann et al. |
| 2017/0123794 A1 * | 5/2017 | Chen .................. G06F 9/3857 |
| 2017/0123795 A1 * | 5/2017 | Chen .................. G06F 9/3857 |
| 2021/0181974 A1 | 6/2021 | Ghosh |
| 2021/0287423 A1 * | 9/2021 | Guenther .............. G06T 1/20 |
| 2022/0198117 A1 * | 6/2022 | Raumann ............... G06F 13/28 |
| 2022/0261365 A1 * | 8/2022 | Prabhakar ............. G06F 9/4494 |
| 2022/0391128 A1 * | 12/2022 | Jain .................. G06F 3/0655 |

OTHER PUBLICATIONS

Office Action for KR 10-2022-0031884 by Korean Intellectual Property Office dated Apr. 4, 2024.

Office Action for KR 10-2022-0031890 by Korean Intellectual Property Office dated Mar. 7, 2024.

\* cited by examiner

NEURAL PROCESSING DEVICE

CROSS-REFERENCE TO RELATED APPLICATIONS

This application is a continuation of U.S. application Ser. No. 18/184,543, filed on Mar. 15, 2023, which claims priority under 35 U.S.C § 119 to Korean Patent Application No. 10-2022-0031884 filed on Mar. 15, 2022, Korean Patent Application No. 10-2022-0031890 filed on Mar. 15, 2022, and Korean Patent Application No. 10-2022-0031888 filed on Mar. 15, 2022, in the Korean Intellectual Property Office, the entire contents of which are hereby incorporated by reference.

TECHNICAL FIELD

The disclosure relates to a neural processing device. Specifically, the disclosure relates to a neural processing device capable of being reconfigured and extended in a hierarchical structure and a processing element included in the neural processing device.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology which realizes human learning ability, reasoning ability, perceptual ability, natural language implementation ability, etc., it is of utmost important to process a large amount of data quickly.

The central processing unit (CPU) or graphics processing unit (GPU) of off-the-shelf computers was used for deep-learning training and inference in early artificial intelligence, but had limitations on the tasks of deep-learning training and inference with high workloads, and thus, neural processing units (NPUs) that are structurally specialized for deep learning tasks have received a lot of attention.

Such a neural processing device may include a large number of processing elements and processor structures therein and may have a hierarchical structure of several levels such that each structure may be optimized for a task. The hierarchical structure may exhibit the highest efficiency when composed of units optimized for deep learning tasks.

The description set forth in the background section should not be assumed to be prior art merely because it is set forth in the background section. The background section may describe aspects or embodiments of the disclosure.

SUMMARY

Aspects of the disclosure provide a neural processing device having a unit configuration optimized for deep learning tasks and having a hierarchical structure that is extensible and reconfigurable.

Aspects of the disclosure provide a processing element included in a neural processing device having a unit configuration optimized for deep learning tasks and having a hierarchical structure that is extensible and reconfigurable.

According to some aspects of the disclosure, a neural processing device comprising processing circuitry comprises a plurality of processing engine groups; a first memory shared by the plurality of engine groups; and a first interconnection configured to transmit data between the first memory and the plurality of processing engine groups, wherein the processing circuitry is configured to provide hardware resource to the plurality of processing engine groups, at least one of the plurality of processing engine groups comprises: a plurality of processing engines, each of the plurality of processing engines comprising an array of a plurality of processing elements interconnected by a mesh style network, the processing elements being reconfigurable; a second memory shared by the plurality of processing engines; and a second interconnection configured to transmit data between the second memory and the plurality of processing engines.

According to some aspects of the disclosure, the processing circuitry is configured to perform monitoring at least one of the plurality of processing engines, the first interconnection, or the first memory, and individually provides the hardware resource according to a monitoring.

According to some aspects of the disclosure, latency sensitivity of the second interconnection is higher than latency sensitivity of the first interconnection.

According to some aspects of the disclosure, a bandwidth of the first interconnection is greater than a bandwidth of the second interconnection.

According to some aspects of the disclosure, a first set of processing engine groups is included in a first processing engine cluster, and a first processing engine cluster further includes a local interconnection between the first set of processing engine groups.

According to some aspects of the disclosure, a second set of processing engine groups is included in a second processing engine cluster, and the first processing engine cluster and the second processing engine cluster are managed by separate modules.

According to some aspects of the disclosure, the plurality of processing engine groups are managed by separate modules.

According to some aspects of the disclosure, the first processing engine cluster includes at least one processing engine group belonging to a first region and at least one processing engine group belonging to a second region, and the at least one processing engine group belonging to the first region and the at least one processing engine group belonging to the second region are managed by separate modules.

According to some aspects of the disclosure, interconnection between the plurality of processing elements is reconfigurable.

According to some aspects of the disclosure, the each of the plurality of processing engines further comprises: at least one third memory storing input data input to the processing elements and output data output from the processing elements; and at least one fourth memory providing an instruction for an operation of the processing elements.

According to some aspects of the disclosure, the processing elements includes a first type of at least one processing element and a second type of at least one processing element.

According to some aspects of the disclosure, the plurality of processing engine groups perform deep learning calculation tasks.

According to some aspects of the disclosure, a compiler stack configuring the plurality of processing engine groups comprises: a first compiler configured to compile operations of the plurality of processing engines; and a second compiler configured to compile operations of the first memory, the first interconnection and at least one of the plurality of processing engine groups.

According to some aspects of the disclosure, the second compiler comprises: a compute library configured to store a preset calculation code; an adaptation layer configured to quantize a deep learning graph to generate a quantization model; a frontend compiler configured to receive the quantization model and convert the quantization model into intermediate representation (IR); and a backend compiler configured to convert the IR into a binary code by referring to the calculation code.

According to some aspects of the disclosure, wherein the first compiler is further configured to determine a dimension of the plurality of processing engines, and perform, on a circuit, optimization scheduling of the plurality of processing engines.

According to some aspects of the disclosure, performing the optimization scheduling comprises: generating a control-flow graph (CFG) according to the deep learning graph; unrolling a loop of the CFG to generate an unrolling CFG; generating a hyperblock of the unrolling CFG to generate a hyperblocking CFG; storing preset hardware constraints; and generating a calculation code at a processing engine level by scheduling the hyperblocking CFG based on the preset hardware constraints.

According to some aspects of the disclosure, a neural processing device comprising processing circuitry comprises: a plurality of processing engines, each of the plurality of processing engine including a processing element (PE) array of a plurality of processing elements interconnected by a mesh style network, at least one first memory configured to store data for the PE array, at least one second memory configured to provide instructions for operating the plurality of processing elements, and at least one load/store unit (LSU) configured to perform load and store for the data, wherein the plurality of processing elements being reconfigurable; a third memory shared by the plurality of processing engines; and an interconnection configured to transmit data between the third memory and the plurality of processing engines.

According to some aspects of the disclosure, the processing circuitry is configured to provide a hardware resource to the plurality of processing engines according to importance of operations performed by the plurality of processing engines.

According to some aspects of the disclosure, a first set of processing engines are included in a first processing engine group, and a second set of processing engines are included in a second processing engine group.

According to some aspects of the disclosure, the first processing group is managed by an upper module; a first subset of processing engines in the first processing engine group is managed by a first lower module associated with the upper module; and a second subset of processing engine in the first processing engine group is managed by a second lower module associated with the upper module.

According to some aspects of the disclosure, each of the plurality of processing elements comprises: an instruction queue configured to receive and divide an instruction including precision; and an input formatter and an output formatter configured to perform precision conversion through the precision.

According to some aspects of the disclosure, a neural processing device comprising processing circuitry comprises: at least one processing engine group comprising a plurality of processing engines, wherein at least one of the plurality of processing engines comprises a plurality of processing elements, the plurality of processing elements are reconfigurable, the processing circuitry is configured to provide the plurality of processing engines with hardware resources, wherein at least one of the plurality of processing element comprises: an instruction queue configured to receive an instruction including precision, a source, an opcode, and a destination; a first register configured to receive the source and the precision from the instruction queue; an input formatter configured to determine an operand through the first register and configured to perform precision conversion; a second register configured to receive the opcode from the instruction queue and configured to determine an operator; and a third register configured to receive the destination and the precision from the instruction queue.

According to some aspects of the disclosure, the neural processing device further comprises an output formatter configured to perform the precision conversion of an output according to the operator of the operand through the third register.

According to some aspects of the disclosure, the input formatter receives the output in bypass by the output formatter.

Aspects of the disclosure are not limited to those mentioned above, and other objects and advantages of the disclosure that have not been mentioned can be understood by the following description, and will be more clearly understood by embodiments of the disclosure. In addition, it will be readily understood that the objects and advantages of the disclosure can be realized by the means and combinations thereof set forth in the claims.

The neural processing device in accordance with the disclosure has a processing unit with a scale optimized for calculations used in deep learning tasks, and thus, efficiency of expansion and reconstruction according to tasks may be maximized.

In addition, the processing element internally performs precision conversion, and thus, it is possible to minimize hardware overhead and to increase a speed of all calculation tasks.

In addition to the foregoing, the specific effects of the disclosure will be described together while elucidating the specific details for carrying out the embodiments below.

DETAILED DESCRIPTION OF THE PREFERRED EMBODIMENTS

Figure 1:
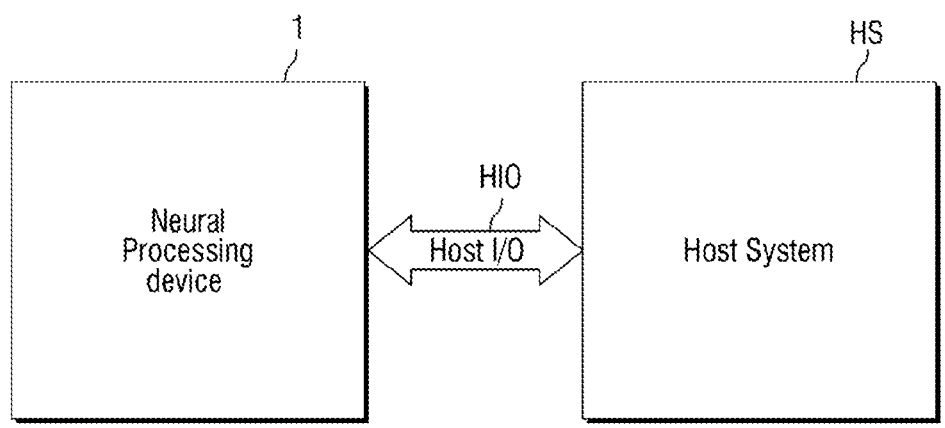
FIG. 1 is a block diagram illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 32.

FIG. 1 is a block diagram illustrating a neural processing system in accordance with some embodiments of the disclosure.

Referring to FIG. 1, a neural processing system NPS according to some embodiments of the disclosure may include a first neural processing device 1, a host system HS, and a host interface HIO.

The first neural processing device 1 may perform calculation by using an artificial neural network. The first neural processing device 1 may be, for example, a device specialized in performing deep learning calculations. However, the embodiment is not limited thereto.

In this case, the first neural processing device 1 may be a processing device other than a neural processing device. That is, the first neural processing device 1 may be a graphics processing unit (GPU), a central processing unit (CPU), or a processing unit of another type. Hereinafter, for the sake of convenience, the first neural processing device 1 will be described as a neural processing device.

The host system HS may instruct the first neural processing device 1 to perform calculations and retrieves a result of the calculations. The host system HS may not be specialized for the deep learning calculations compared to the first neural processing device 1. However, the embodiment is not limited thereto.

The host interface HIO may transmit and receive data and control signals to and from the first neural processing device 1 and the host system HS. The host interface HIO may transmit, for example, commands and data of the host system HS to the first neural processing device 1, and accordingly, the first neural processing device 1 may perform calculations. When the calculations completed, the first neural processing device 1 may transmit a result the calculation task to the host system HS in response to an interrupt request. The host interface HIO may be, for example, PCI express (PCIe) but is not limited thereto.

Figure 2:
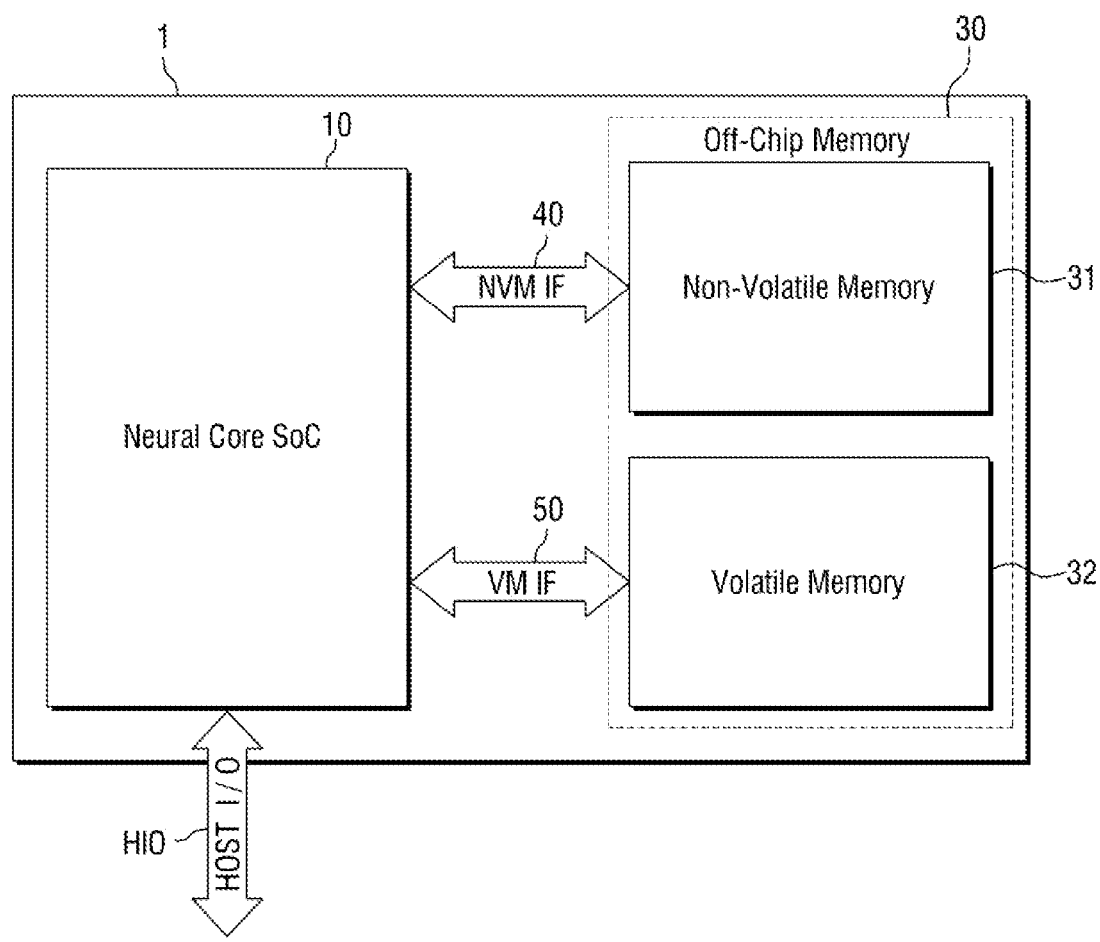
FIG. 2 is a block diagram specifically illustrating a neural processing device of FIG. 1.

FIG. 2 is a block diagram specifically illustrating the neural processing device of FIG. 1.

Referring to FIG. 2, the first neural processing device 1 may include a neural core system on chip (SoC) 10, an off-chip memory 30, a non-volatile memory interface 40, and a volatile memory interface 50.

The neural core SoC 10 may be a system on chip device. The neural core SoC 10 may be an accelerator serving as an artificial intelligence computing unit. The neural core SoC 10 may be any one of, for example, a GPU, a field programmable gate array (FPGA), or an application-specific integrated circuit (ASIC). The embodiment is not limited thereto.

The neural core SoC 10 may exchange data with other external computing units through a separate external interface. In addition, the neural core SoC 10 may be connected to the non-volatile memory 31 through the non-volatile memory interface 40. The neural core SoC 10 may be connected to the volatile memory 32 through the volatile memory interface 50.

The off-chip memory 30 may be arranged outside a chip of the neural core SoC 10. The off-chip memory 30 may include the non-volatile memory 31 and the volatile memory 32.

The non-volatile memory 31 may continuously maintain stored information even when power is not supplied. The non-volatile memory 31 may include at least one of, for example, read-only memory (ROM), programmable ROM (PROM), erasable alterable ROM (EAROM), erasable programmable ROM (EPROM), electrically erasable PROM (EEPROM) (for example, NAND Flash memory, or NOR Flash memory), ultra-violet erasable PROM (UVEPROM), ferroelectric random access memory (FeRAM), magnetoresistive RAM (MRAM), phase-change RAM (PRAM), silicon-oxide-nitride-oxide-silicon (SONOS) flash memory, resistive RAM (RRAM), nanotube RAM (NRAM), a magnetic computer memory device (for example, a hard disk, a diskette drive, or a magnetic tape), an optical disk drive, or three-dimensional (3D) XPoint memory. However, the embodiment is not limited thereto.

Unlike the non-volatile memory 31, the volatile memory 32 may continuously require power to maintain stored information. The volatile memory 32 may include at least one of, for example, dynamic RAM (DRAM), static RAM (SRAM), synchronous dynamic RAM (SDRAM), or double data rate SDRAM (DDR SDRAM). However, the embodiment is not limited thereto.

The non-volatile memory interface 40 may include at least one of, for example, a parallel advanced technology attachment (PATA) interface, a small computer system interface (SCSI), a serial attached SCSI (SAS), a serial advanced technology attachment (SATA) interface, or a PCI express (PCIe) interface. However, the embodiment is not limited thereto.

The volatile memory interface 50 may include at least one of, for example, a single data rate (SDR), a double data rate (DDR), a quad data rate (QDR), or an extreme data rate (XDR). However, the embodiment is not limited thereto.

Figure 3:
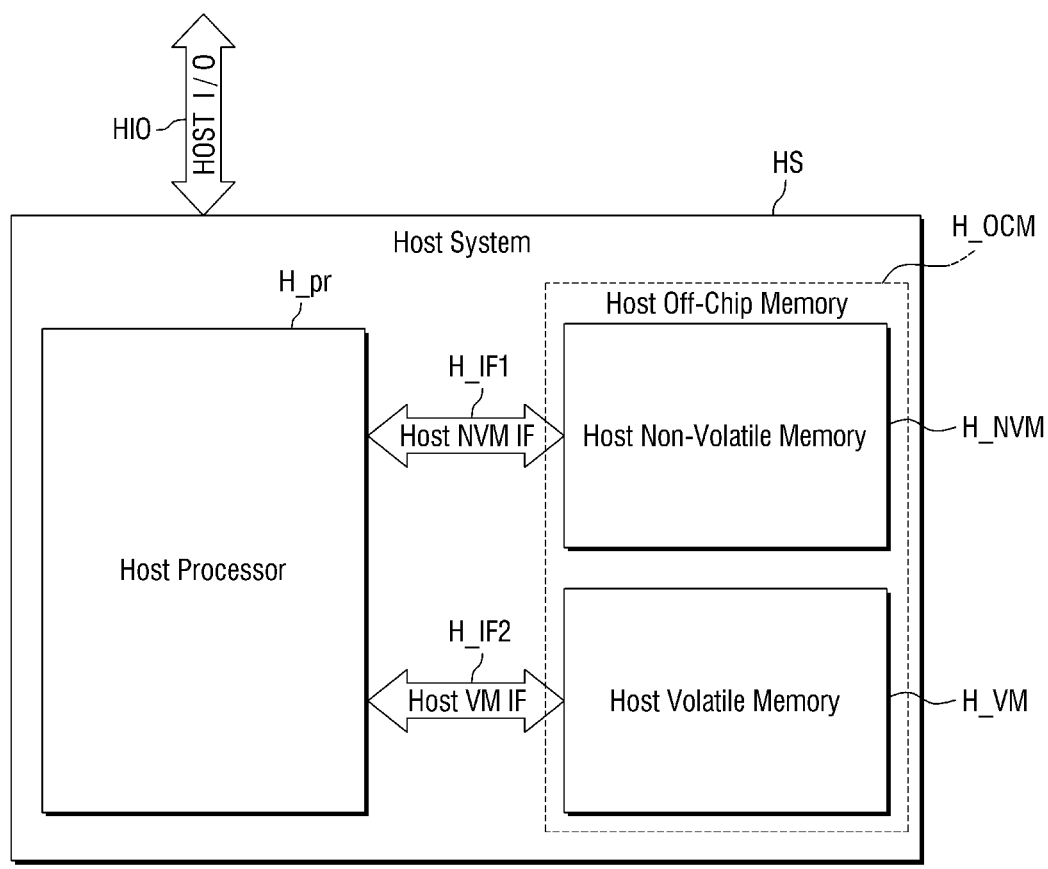
FIG. 3 is a block diagram specifically illustrating a host system of FIG. 1.

FIG. 3 is a block diagram specifically illustrating the host system HS of FIG. 1.

Referring to FIG. 3, the host system HS may include a host processor H_pr, a host off-chip memory H_OCM, a host non-volatile memory interface H_IF1, and a host volatile memory interface H_IF2.

The host processor H_pr may be a controller that controls a system of the first neural processing device 1 and performs calculations of a program. The host processor H_pr may be a general-purpose calculation unit and may have low efficiency to perform simple parallel calculations widely used in deep learning. Accordingly, the neural core SoC 10 may perform calculations for deep learning inference and learning operations, thereby achieving high efficiency.

The host processor H_pr may be coupled with a host non-volatile memory H_NVM through the host non-volatile memory interface H_IF1. The host processor H_pr may be coupled with a host volatile memory H_VM through the host volatile memory interface H_IF2.

The host processor H_pr may transmit tasks to the neural core SoC 10 through commands. In this case, the host processor H_pr may be a kind of host that gives instructions to the neural core SoC 10, and may be a subject that gives instructions for operations. That is, the neural core SoC 10 may efficiently perform parallel calculation tasks such as deep learning calculation tasks according to instructions from the host processor H_pr.

The host off-chip memory H_OCM may be arranged outside a chip of the host processor H_pr. The host off-chip memory H_OCM may include the host non-volatile memory H_NVM and the host volatile memory H_VM.

The host non-volatile memory H_NVM may maintain stored information even when power is not supplied. The host non-volatile memory H_NVM may include at least one of, for example, ROM, PROM, EAROM, EPROM, EEPROM (for example, NAND Flash memory, or NOR Flash memory), UVEPROM, FeRAM, MRAM, PRAM, SONOS flash memory, RRAM, NRAM, a magnetic computer memory device (for example, a hard disk, a diskette drive, or a magnetic tape), an optical disk drive, or 3D XPoint memory. However, the embodiment is not limited thereto.

Unlike the host non-volatile memory H_NVM, the host volatile memory H_VM may be a memory that continuously requires power to maintain stored information. The host volatile memory H_VM may include at least one of, for example, DRAM, SRAM, SDRAM, or DDR SDRAM. However, the embodiment is not limited thereto.

The host non-volatile memory interface H_IF1 may include at least one of, for example, a PATA interface, a SCSI, a SAS, a SATA interface, or PCIe interface. However, the embodiment is not limited thereto.

Each of the host volatile memory interfaces H_IF2 may include at least one of, for example, an SDR, a DDR, a QDR, or an XDR. However, the embodiment is not limited thereto.

Figure 4:
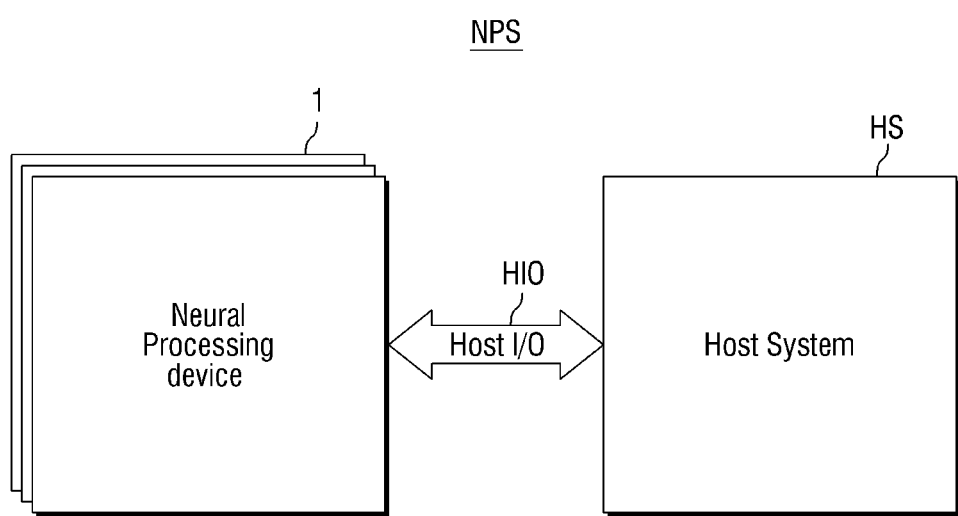
FIG. 4 is a block diagram illustrating a neural processing system in accordance with some embodiments of the disclosure.

FIG. 4 is a block diagram illustrating a neural processing system according to some embodiments of the disclosure.

Referring to FIG. 4, The neural processing system may include a plurality of first neural processing devices 1. Each of the first neural processing devices 1 may be coupled with the host system HS through the host interface HIO. Although one host interface HIO is illustrated in the FIG. 4, the host interface HIO may include a plurality of interfaces respectively coupling the plurality of first neural processing devices 1 with the host system HS.

The plurality of first neural processing devices 1 may exchange data and signals with each other. The plurality of first neural processing devices 1 may transmit and receive data and signals to and from each other through separate interfaces thereof without passing through the host system HS. However, the embodiment is not limited thereto.

Figure 5:
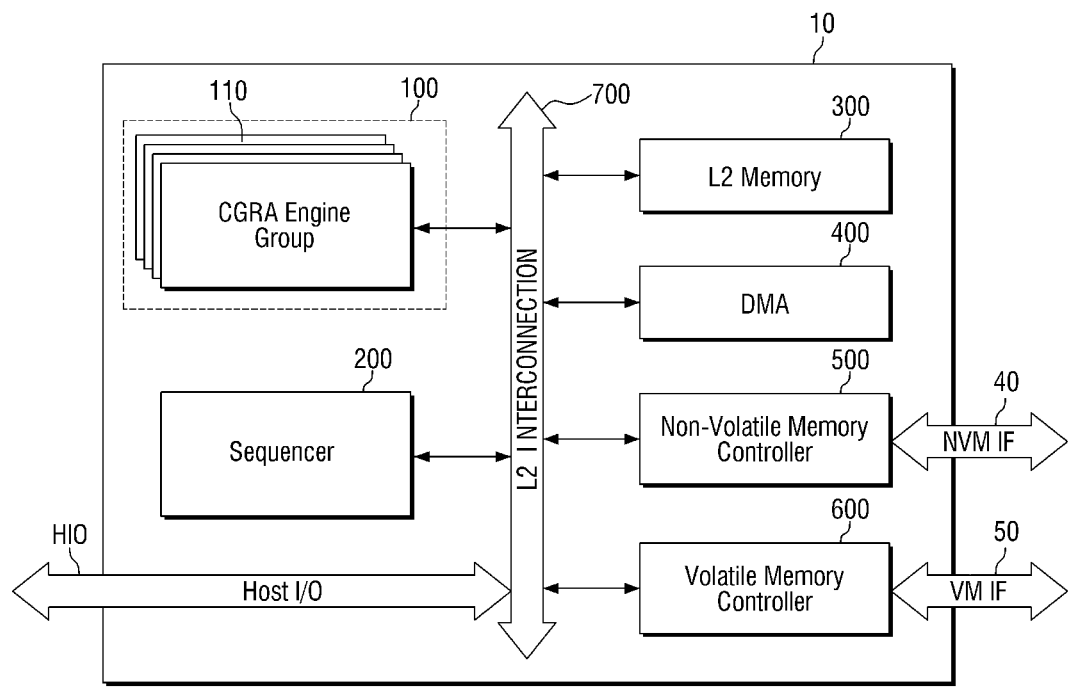
FIG. 5 is a block diagram specifically illustrating a neural core system on chip (SoC) of FIG. 2.

FIG. 5 is a block diagram specifically illustrating the neural core SoC of FIG. 2.

Referring to FIGS. 2 and 5, the neural core SoC 10 may include a coarse grained reconfigurable architecture (CGRA) engine cluster 100, a sequencer 200, an L2 memory 300, direct memory access (DMA) 400, a non-volatile memory controller 500, a volatile memory controller 600, and an L2 interconnection 700.

The CGRA engine cluster 100 may include a plurality of CGRA engine groups 110. Although FIG. 5 illustrates only one CGRA engine cluster 100, the embodiment is not limited thereto.

Each of the CGRA engine groups 110 may be a calculation device that directly performs calculations. When there are the plurality of CGRA engine groups 110, the calculation tasks may be respectively assigned to the plurality of CGRA engine groups 110. Each of the CGRA engine groups 110 may be coupled with each other through the L2 interconnection 700.

The sequencer 200 may individually provide hardware resources to the CGRA engine groups 110. In this case, the sequencer 200 may be named a sequencer circuit, but for the sake of convenience, the terms are unified as a sequencer. In addition, the sequencer 200 may be implemented as a circuit or circuitry. In some embodiments, the sequencer 200 may determine importance of operations of the CGRA engine groups 110, and accordingly, provide the CGRA engine groups 110 with the hardware resources differently. In some embodiments, the sequencer 200 may determine importance of operations of CGRA engines in the CGRA engine groups 110, and accordingly, provide the CGRA engines with the hardware resources differently. In other words, the sequencer 200 may determine priority of operations of CGRA engines in the CGRA engine groups 110, and may provide the CGRA engines the hardware resources according to the priority. In this case, the hardware resources may include at least one of a voltage, power, a frequency, or a bandwidth. However, the embodiment is not limited thereto.

The sequencer 200 may perform sequencing operations to individually provide the hardware resources to the CGRA engine groups 110, and the sequencing operations may be performed by a circuit of the neural processing device according to the embodiment.

The sequencer 200 may monitor operations of the CGRA engine groups 110 in the CGRA engine cluster 100 and provide the hardware resources to the CGRA engine groups 110. The sequencer 200 may monitor various performance parameters of the CGRA engine groups 110. The sequencer 200 may detect a performance problem determined by the monitoring and provide hardware resources according thereto. Accordingly, the CGRA engine groups 110 may efficiently perform various calculation tasks according to instructions from the sequencer 200.

The sequencer 200 may determine the importance based on various criteria. First, the sequencer may determine the importance according to quality of service (QOS). That is, a priority selection method for guaranteeing performance of a specific level may be used by the sequencer 200.

In addition, the sequencer 200 may determine the importance according to service level objectives (SLOs). The SLOs may be set to appropriate values in advance and may be updated in various ways later.

That is, the sequencer 200 may determine importance of an operation based on criteria, such as QoS and/or SLO and provide hardware resources according thereto.

The L2 memory 300 may be shared by the CGRA engine groups 110. The L2 memory 300 may store data of the CGRA engine groups 110. In addition, the L2 memory 300 may receive data from the off-chip memory 30, temporarily store the data, and transmit the data to each of the CGRA engine groups 110. In contrast to this, the L2 memory 300 may receive data from the CGRA engine groups 110, temporarily store the data, and transmit the data to the off-chip memory 30.

The L2 memory 300 may require a relatively fast memory. Accordingly, the L2 memory 300 may include, for example, SRAM. However, the embodiment is not limited thereto. That is, the L2 memory 300 may include DRAM.

The L2 memory 300 may correspond to an SoC level, that is, a level 2 (L2). That is, the L2 memory 300 may operate at the level 2 of a hierarchical structure. The hierarchical structure is described in more detail below.

The DMA 400 may directly control movement of data without the need for the CGRA engine groups 110 to control the input/output of data. Accordingly, the number of interrupts of the CGRA engine groups 110 may be minimized by the DMA 400 controlling data movement between memories.

The DMA 400 may control movement of data between the L2 memory 300 and the off-chip memory 30. Through authority of the DMA 400, the non-volatile memory controller 500 and the volatile memory controller 600 may transmit data.

The non-volatile memory controller 500 may control a read operation or a write operation of the non-volatile memory 31. The non-volatile memory controller 500 may control the non-volatile memory 31 through the first non-volatile memory interface 40.

The volatile memory controller 600 may control a read operation or a write operation of the volatile memory 32. In addition, the volatile memory controller 600 may perform a refresh operation of the volatile memory 32. The volatile memory controller 600 may control the non-volatile memory 31 through the first volatile memory interface 50.

The L2 interconnection 700 may couple at least one of the CGRA engine groups 110, the L2 memory 300, the DMA 400, the non-volatile memory controller 500, or the volatile memory controller 600 with each other. In addition, the host interface HIO may be coupled with the L2 interconnection 700. The L2 interconnection 700 may be a path through which data is transmitted and received between at least one of the CGRA engine groups 110, the L2 memory 300, the DMA 400, the non-volatile memory controller 500, the volatile memory controller 600, and the host interface HIO.

The L2 interconnection 700 may transmit signals for synchronization and transmission of control signals as well as data. That is, in the neural processing device according to some embodiments of the disclosure, a separate control processor does not manage synchronization signals, and the CGRA engine groups 110 may directly transmit and receive the synchronization signals. Accordingly, latency of the synchronization signals generated by the control processor may be blocked.

That is, when there are the plurality of CGRA engine groups 110, there may be dependency of individual operation in which another CGRA engine group 110 may start a new operation after an operation of one of the plurality of CGRA engine groups 110 is finished. Accordingly, in the neural processing device according to some embodiments of the disclosure, the plurality of CGRA engine groups 110, instead of a control processor, may each directly transmit a synchronization signal to another one of the plurality of CGRA engine groups 110 according to the dependency of an operation. In this case, the plurality of CGRA engine groups 110 may perform synchronization operations in parallel compared to a method managed by a control processor, and thus, latency due to synchronization may be minimized.

Figure 6:
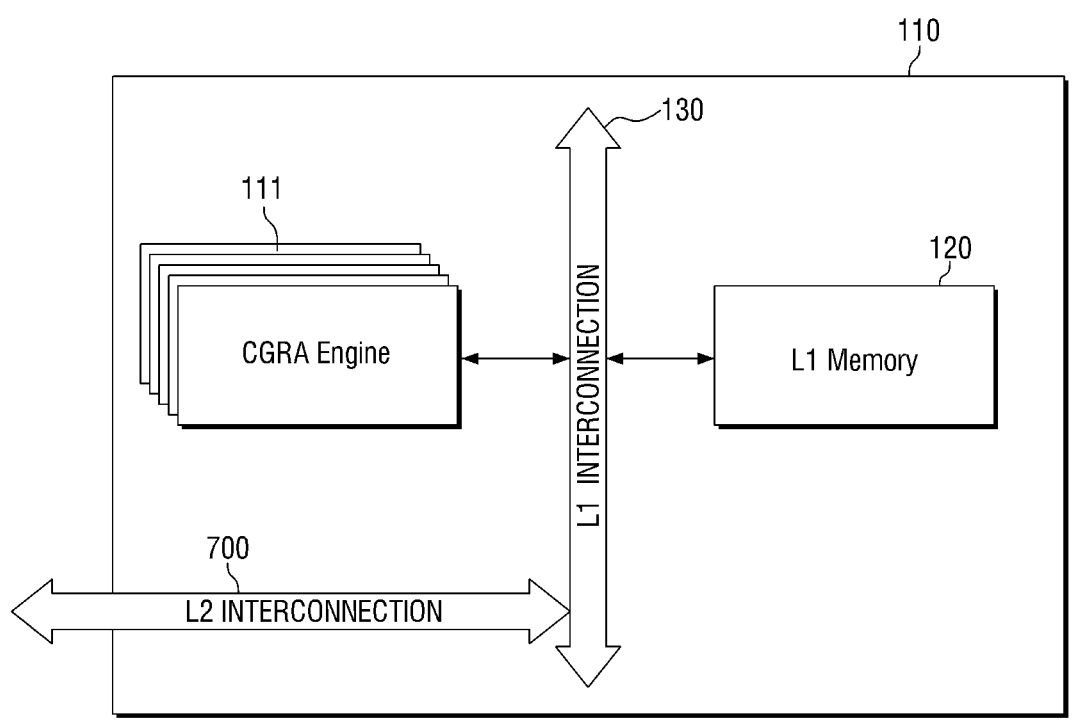
FIG. 6 is a block diagram specifically illustrating a coarse grained reconfigurable architecture (CGRA) engine group of FIG. 5.

FIG. 6 is a block diagram specifically illustrating one of the CGRA engine groups of FIG. 5.

Referring to FIGS. 5 and 6, each of the CGRA engine groups 110 may include at least one CGRA engine (CE) 111, an L1 memory 120, or an L1 interconnection 130. In this case, the CGRA engine 111 may be named a CGRA engine circuit, but for the sake of convenience, the terms are unified as a CGRA engine. In addition, each of the at least one CGRA engine 111 may be implemented as a circuit or circuitry.

The at least one CGRA engine 111 may share operations of one of the CGRA engine groups 110. The at least one CGRA engine 111 may be a kind of processor. That is, the at least one CGRA engine 111 may derive calculation results by performing calculation tasks.

There may be a plurality of the CGRA engines 111. However, the embodiment is not limited thereto. Although FIG. 6 illustrates that the plurality of CGRA engines 111 are included in the one of the CGRA engine groups 110, but the embodiment is not limited thereto. That is, one of the CGRA engine groups 110 may include only one CGRA engine 111.

The L1 memory 120 may be shared by the at least one CGRA engine 111 within the one of the CGRA engine groups 110. The L1 memory 120 may store data of the at least one CGRA engine 111. In addition, the L1 memory 120 may receive data from the L2 memory 300, temporarily store the data, and transmit the data to the at least one CGRA engine 111. In contrast to this, the L1 memory 120 may receive data from the at least one CGRA engine 111, temporarily store the data, and transmit the data to the L2 memory 300.

The L1 memory 120 may correspond to the CGRA engine group level, that is, a level 1 (L1). That is, the L2 memory 300 may be shared by the CGRA engine groups 110, and the L1 memory 120 may be shared by the at least one CGRA engine 111.

The L1 interconnection 130 may couple the at least one CGRA engine 111 with the L1 memory 120 each other. The L1 interconnection 130 may be a path through which data is transmitted and received between the at least one CGRA engine 111 and the L1 memory 120. The L1 interconnection 130 may be coupled with the L2 interconnection 700 such that data is transmit therebetween.

The L1 interconnection 130 may have relatively higher latency sensitivity than the L2 interconnection 700. That is, data transmission through the L1 interconnection 130 may be performed faster than through the L2 interconnection 700.

In contrast to this, the L2 interconnection 700 may have greater bandwidth than the L1 interconnection 130. Since the L2 interconnection 700 requires more data to be transmitted than the L1 interconnection 130, bottleneck effects may occur when the bandwidth is smaller, and performance of the entire device may be reduced. Accordingly, the L1 interconnection 130 and the L2 interconnection 700 may be designed to focus on different performance parameters.

Additionally, the L2 interconnection 700 may have an expandable structure. That is, a dimension of the at least one CGRA engine 111 or a dimension of one of the CGRA engine groups 110 may be fixed to some extent for optimization of operations. In contrast to this, a dimension of the CGRA engine cluster 100 increases as a hardware resource increases, and thus, expandability of the L2 interconnection 700 may be one of very important characteristics.

Here, the dimension may indicate a scale of the at least one CGRA engine 111 or one of the CGRA engine groups 110. That is, the CGRA engine groups 110 may include at least one CGRA engine 111, and accordingly, the dimension of one of the CGRA engine groups 110 may be determined according to the number of the at least one CGRA engine 111 included in the one of the CGRA engine groups 110. Similarly, the at least one CGRA engine 111 may also include at least one component among processing elements, instruction memories, L0 memories, or load/store units (LSU), and accordingly, the dimension of the CGRA engine 111 may be determined according to the number of components.

Figure 7:
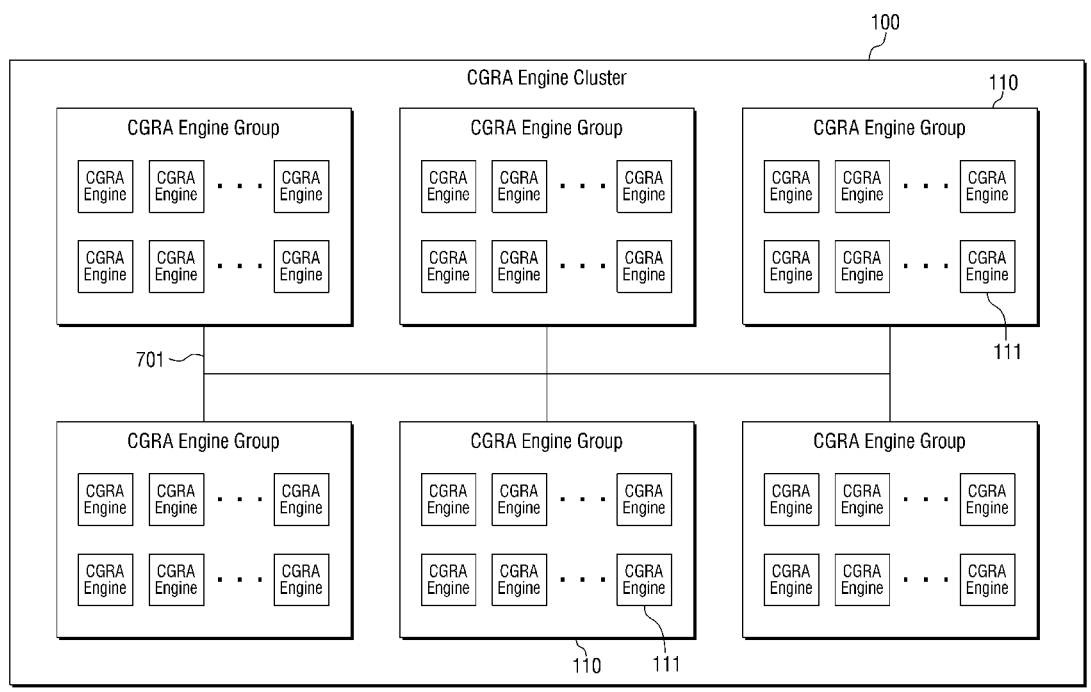
FIG. 7 is a conceptual diagram illustrating a hardware structure of a CGRA engine group of FIG. 5.

FIG. 7 is a conceptual diagram illustrating a hardware structure of the CGRA engine group of FIG. 5.

Referring to FIG. 7, the CGRA engine cluster 100 may include at least one CGRA engine group 110. Each of the at least one CGRA engine group 110 may transmit data to each other through a local interconnection 701. The local interconnection 701 may be an interconnection formed separately from the L2 interconnection 700. Alternatively, the local interconnection 701 may be a separate private channel for communication between the at least one CGRA engine group 110 within the L2 interconnection 700.

Each of the at least one CGRA engine group 110 may include at least one CGRA engine 111. Each of the at least one CGRA engine 111 may be a processing unit optimized for deep learning calculation tasks. That is, the deep learning calculation tasks may be represented as a sequential or parallel combination of several operations. Each of the at least one CGRA engine 111 may be a processing unit capable of processing one operation and may be a minimum operation unit that may be considered for scheduling from the viewpoint of a compiler.

In the neural processing device according to the embodiment, a scale of a minimum calculation unit considered from the viewpoint of compiler scheduling is configured in the same manner as a scale of a hardware processing unit, and thus, fast and efficient scheduling and calculation tasks may be performed. In addition, according to the embodiment, efficiency may be maximized by flexibly changing a size and the number of processing units, and hardware scaling may be optimized by the hierarchical structure of a processor and a memory.

That is, when a divisible processing unit of hardware is too large compared to an calculation task, inefficiency of the calculation task may occur in driving the processing unit. In contrast to this, it is not appropriate to schedule every time a processing unit smaller than an operation which is the minimum scheduling unit of a compiler, because scheduling inefficiency may occur and hardware design cost may increase.

Therefore, according to the embodiment, a scale of scheduling unit of a compiler and a scale of a hardware processing unit may be approximated, and thus, scheduling of a fast calculation task and efficient calculation task may be performed at the same time without wasting of hardware resources.

Figure 8A:
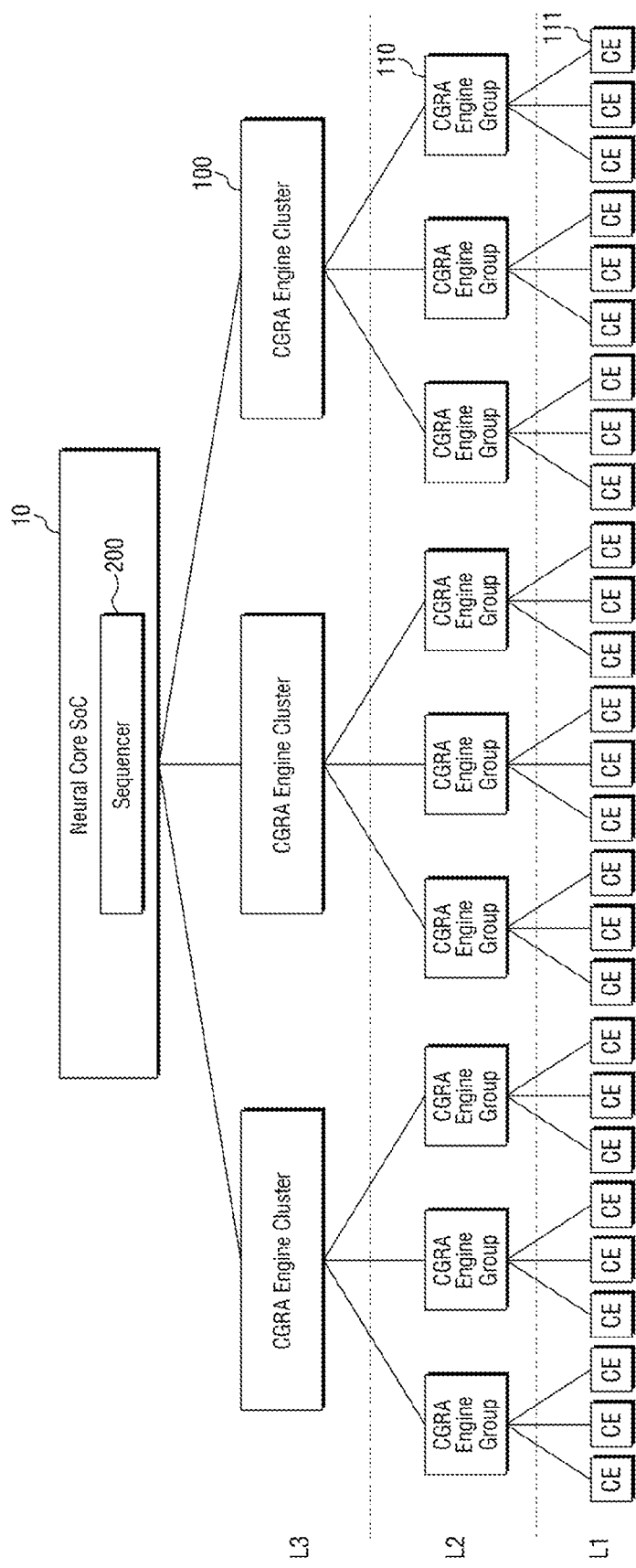
FIG. 8A is a conceptual diagram illustrating a hierarchical structure of a neural core SoC of FIG. 2.

FIG. 8A is a conceptual diagram illustrating a hierarchical structure of a neural core SoC.

Referring to FIG. 8A, the neural core SoC 10 may include at least one CGRA engine cluster 100 at the highest level. Each of the at least one CGRA engine cluster 100 may include at least one CGRA engine group 110. Furthermore, each of the at least one CGRA engine group 110 may include at least one CGRA engine 111.

In this case, a level of the CGRA engine 111, which is the lowest level, may be defined as L1, that is, a first level. Accordingly, a level of the at least one CGRA engine group 110, which is a higher level than the first level, may be defined as L2, that is, the second level, and a level of the at least one CGRA engine cluster 100, which is a higher level than the second level, may be defined as L3, that is, a third level.

Although FIG. 8A illustrates three levels of a hierarchical structure of the neural processing device according to some embodiments of the disclosure, the embodiment is not limited thereto. That is, according to the embodiment, a cluster in a higher level than the at least one CGRA engine cluster 100 may be defined, and a hierarchical structure having four or more levels may be provided.

In contrast to this, a neural processing device according to some embodiments of the disclosure may be implemented to have three or less levels. That is, the number of levels of the hierarchical structure may be defined as two or one. In particular, when there is one level, the at least one CGRA engine 111 may be in a flat unfolded form. In this case, the total number of the at least one CGRA engine 111 may change depending on size of the at least one CGRA engine 111. That is, a granule size of the at least one CGRA engine 111 may be a major parameter for determining a shape of the neural processing device.

In contrast to this, when the embodiment is implemented to have multiple levels, hardware optimization may be further improved as the number of levels increases. That is, the embodiment has a hierarchy of shared memories and an calculation device of various levels, and thus additional inefficiency resulting from parallel calculation according to the type of an operation may be eliminated. Accordingly, as long as the number of levels does not exceed the number of levels in the hierarchy that the hardware may provide, the higher the number of levels is, the higher the hardware optimization may be implemented. In this case, the number of levels may be an important parameter for determining the type of the neural processing device along with the granule size.

The embodiment may determine the granule size and the number of levels in a desired direction. Accordingly, it is possible to flexibly increase efficiency according to the size of an operation and to adjust the number of levels of a hierarchical structure for optimization of hardware. Accordingly, the embodiment may flexibility perform a parallel operation while maintaining hardware optimization through such adjustment. Through this, the embodiment may flexibly and efficiently perform an operation by determining sizes of the plurality of CGRA engines 111 according to the size of operations to be tiled due to the nature of a deep learning calculation task.

Figure 8B:
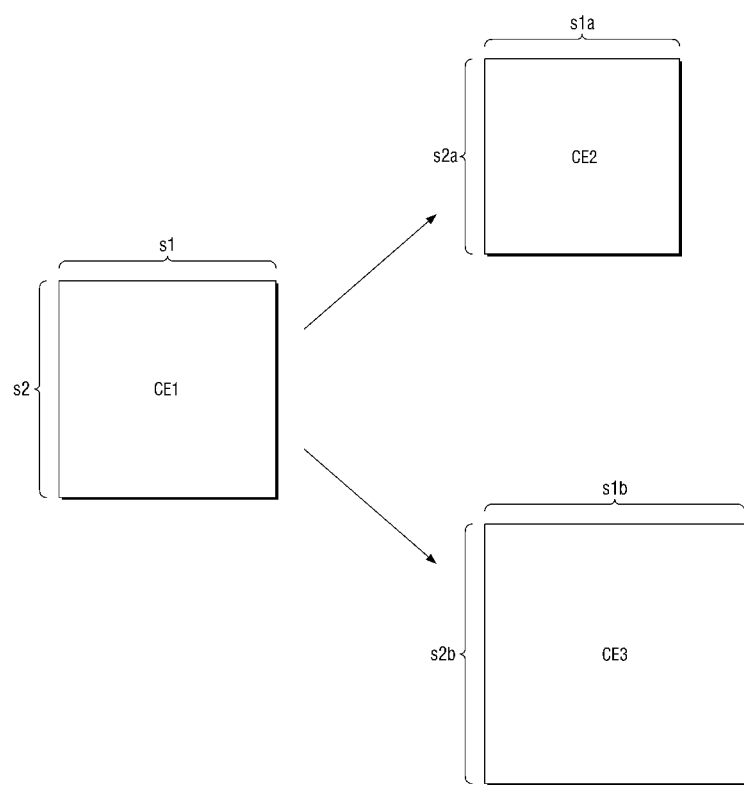
FIG. 8B is a diagram illustrating variability of granules of a CGRA engine of a neural processing device in accordance with some embodiments of the disclosure.

FIG. 8B is a diagram illustrating variability of granules of a CGRA engine of a neural processing device according to some embodiments of the disclosure.

Referring to FIGS. 8A and 8B, the CGRA engine 111 may be a calculation element unit that may be reconfigured at any time. That is, the CGRA engine 111 may be defined aa a standard of a first size (s1*s2) previously set like a first CE CE1, but the disclosure is not limited thereto.

That is, the CGRA engine 111 may also be defined to have a standard of a second size (s1a*s2a) less than the first size (s1*s2), such as a second CE CE2. In addition, the CGRA engine 111 may also be defined to have a standard of a third size (s1b*s2b) greater than the first size (s1*s2), such as a third CE CE3.

That is, the CGRA engine 111 may flexibly determine the number of elements, such as processing elements selected therein, so as to vary a size thereof, and the CGRA engine 111 of which size is determined may form a basic unit of the entire hierarchical structure.

Referring again to FIG. 8A, the sequencer 200 may control all of the plurality of CGRA engine clusters 100, the plurality of CGRA engine groups 110, and the plurality of CGRA engines 111 at the highest level. Specifically, the sequencer 200 may control distribution and operation performance of calculation tasks of the plurality of CGRA engine clusters 100, and the distribution and operation performance of the calculation tasks of the plurality of CGRA engine groups 110 may be performed through control. Furthermore, the sequencer 200 may perform the distribution and operation performance of the calculation tasks of the plurality of CGRA engines 111 through control and perform control of the plurality of CGRA engine groups 110. Since the sequencer 200 may control all of the plurality of CGRA engine clusters 100, it is possible to smoothly control all operations.

That is, the sequencer 200 may control all levels of L1, L2, and L3. In addition, the sequencer 200 may monitor all levels.

Figure 9:
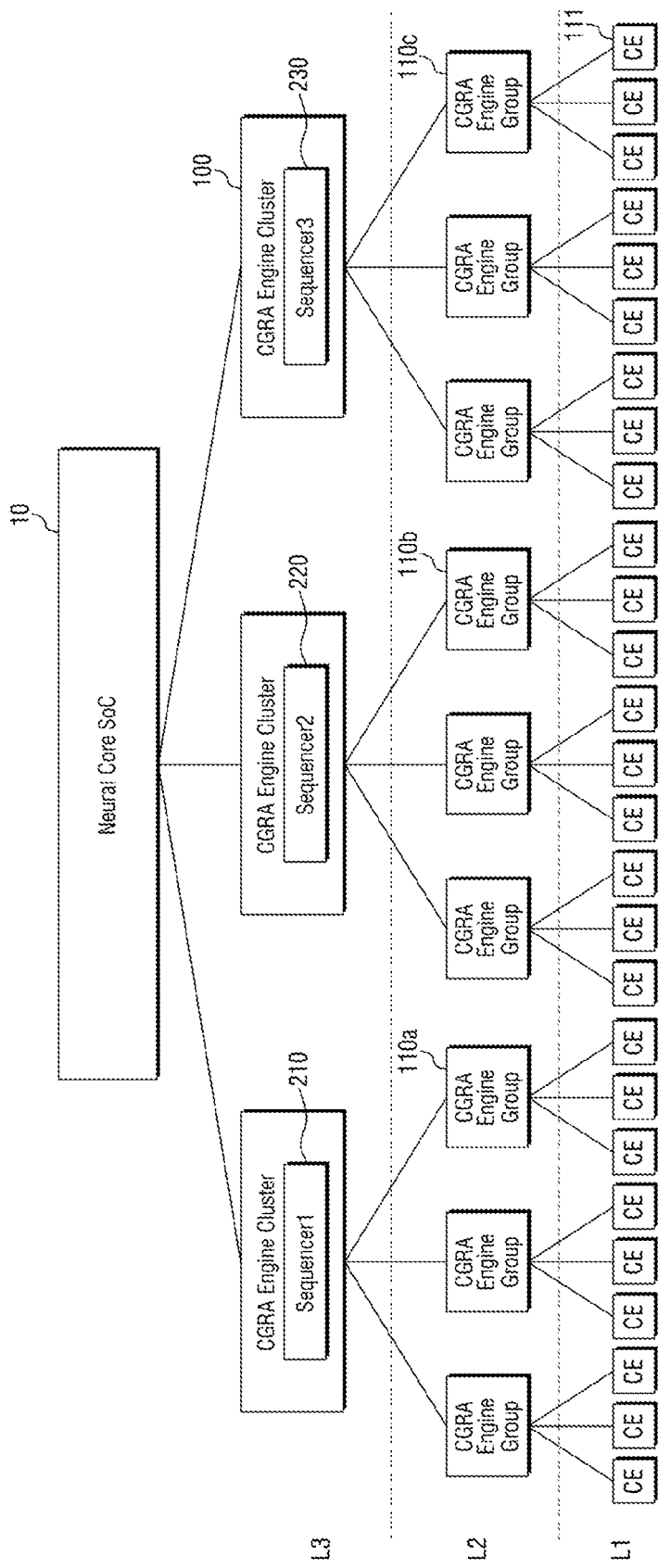
FIG. 9 is a conceptual diagram illustrating a neural processing device in accordance with some embodiments of the disclosure.

FIG. 9 is a conceptual diagram illustrating a neural processing device according to some embodiments of the disclosure.

Referring to FIGS. 5 and 9, there may be a plurality of sequencers 200 so as to be divided and managed for each CGRA engine cluster 100 at the level L3. That is, the sequencer 200 may include a first sequencer 210, a second sequencer 220, and a third sequencer 230 which are managed by different CGRA engine clusters 100. Although FIG. 7 illustrates three CGRA engine clusters 100 and the first, second, and third sequencers 210, 220, and 230, the embodiment is not limited thereto. The number of CGRA engine clusters 100 and the number of sequencers 210, 220, and 230 corresponding thereto may be changed.

Each of the plurality of CGRA engine clusters 100 may include a plurality of CGRA engine groups. For example, a first CGRA engine cluster of the plurality of CGRA engine clusters 100 may include a first set of CGRA engine groups 110*a*. The second CGRA engine cluster of the plurality of CGRA engine clusters 100 may include a second set of CGRA engine groups 110*b*. The third CGRA engine cluster of the plurality of CGRA engine clusters 100 may include a third set of CGRA engine groups 110*c*. In this case, the first sequencer 210 may control and monitor an operation of the first set of CGRA engine groups 110*a* and an operation of the CGRA engines 111 included in the first set of CGRA engine groups 110*a*. Similarly, the second sequencer 220 may control and monitor an operation of the second set of CGRA engine groups 110*b* and an operation of the CGRA engines 111 included in the second set of CGRA engine groups 110*b*. The third sequencer 230 may control and monitor an operation of the third set of CGRA engine groups 110*c* and an operation of the CGRA engines 111 included in the third set of CGRA engine groups 110*c*.

In the embodiment, overhead concentrated on one sequencer 200 may be distributed. Accordingly, latency due to the sequencer 200 or performance degradation of the entire device may be prevented, and parallel control for each CGRA engine cluster 100 may be performed.

Figure 10:
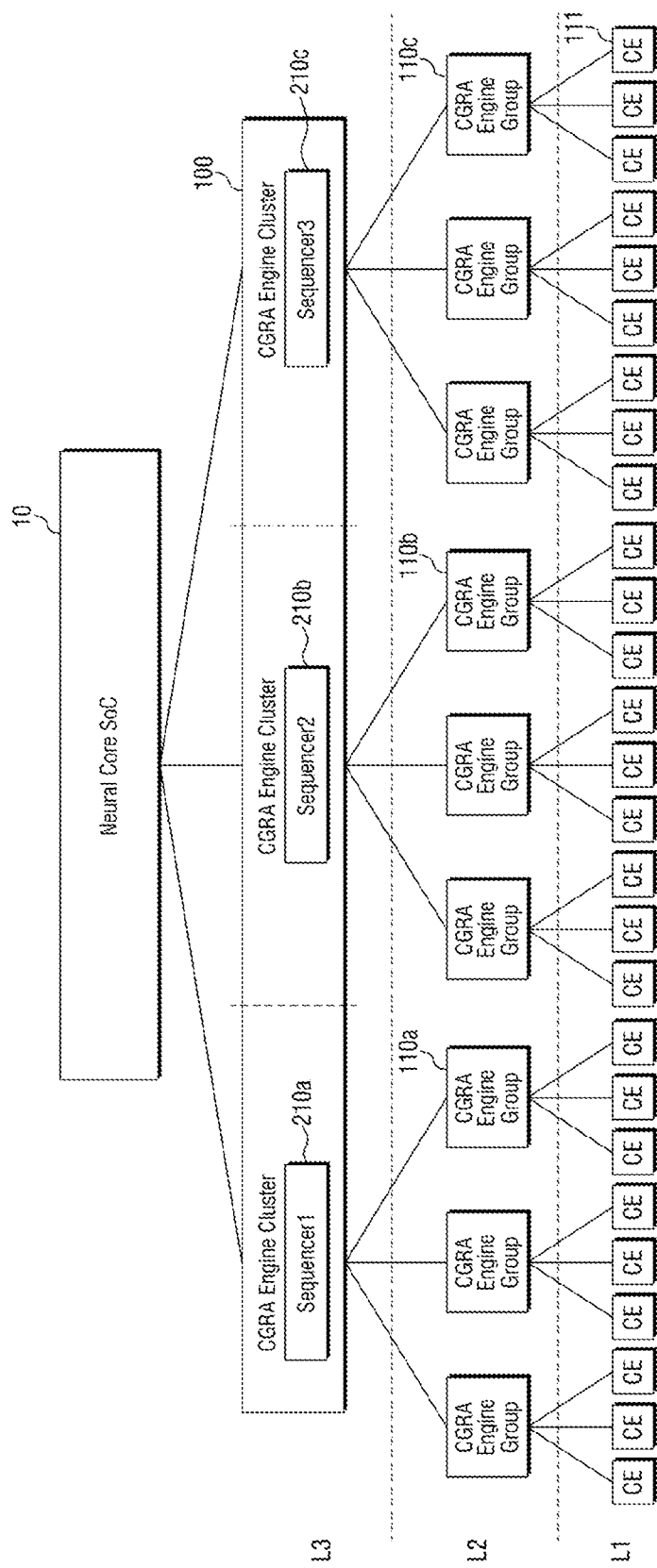
FIG. 10 is a conceptual diagram illustrating a neural processing device in accordance with some embodiments of the disclosure.

FIG. 10 is a conceptual diagram illustrating a neural processing device according to some embodiments of the disclosure.

Referring to FIGS. 5 and 10, one CGRA engine cluster 100 may include a plurality of sequencers 210*a*, 210*b*, and 210*c*. That is, the sequencer 200 may include a first region sequencer 210*a*, a second region sequencer 210*b*, and a third region sequencer 210*c*. In this case, the number of the first, second, and third region sequencers 210*a*, 210*b*, and 210*c* may be changed.

The first region sequencer 210*a* may manage the first set of CGRA engine groups 110*a* corresponding to a first region of one CGRA engine cluster 100 and the CGRA engines 111 included in the first set of CGRA engine groups 110*a*. The second region sequencer 210*b* may manage the second set of CGRA engine groups 110*b* corresponding to a second region of one CGRA engine cluster 100 and the CGRA engines 111 included in the second set of CGRA engine groups 110*b*. The third region sequencer 210*c* may manage the third set of CGRA engine groups 110*c* corresponding to a third region of one CGRA engine cluster 100 and the CGRA engines 111 included in the third set of CGRA engine groups 110*c*.

In the embodiment, an operation of a sequencer may be divided simply by dividing only a region without separately designing hardware for configuring the CGRA engine cluster 100. That is, overhead concentrated on one sequencer 200 may be distributed while minimizing hardware resources. Accordingly, latency due to the sequencer 200 or performance degradation of the entire device may be prevented, and parallel control for each CGRA engine cluster 100 may be performed.

Figure 11:
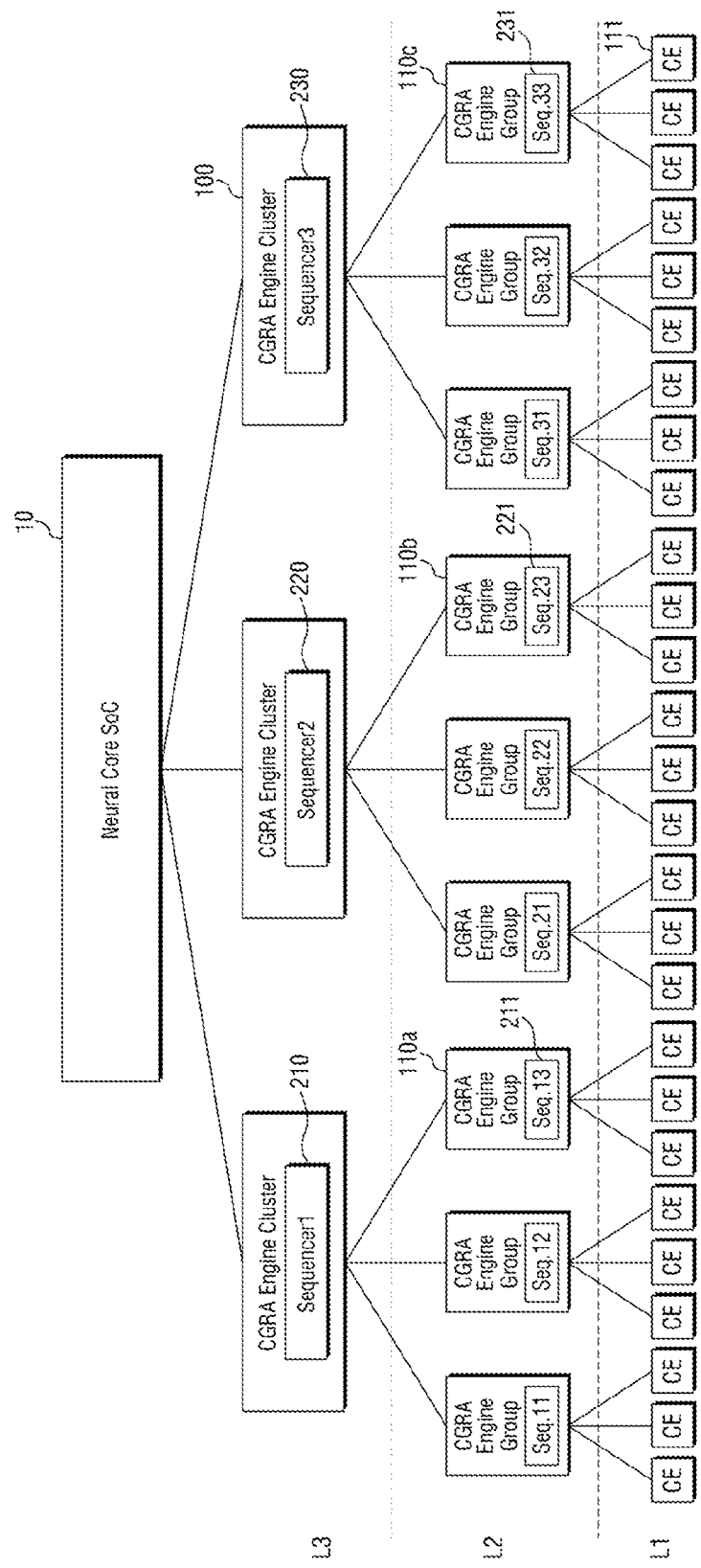
FIG. 11 is a conceptual diagram illustrating a neural processing device in accordance with some embodiments of the disclosure.

FIG. 11 is a conceptual diagram illustrating a neural processing device according to some embodiments of the disclosure.

Referring to FIGS. 5 and 11, each of a plurality of CGRA engine clusters 100 may include a plurality of CGRA engine groups. For example, a first CGRA engine cluster of the plurality of CGRA engine clusters 100 may include a first set of CGRA engine groups 110*a*. The second CGRA engine cluster of the plurality of CGRA engine clusters 100 may include a second set of CGRA engine groups 110*b*. The third CGRA engine cluster of the plurality of CGRA engine clusters 100 may include a third set of CGRA engine groups 110*c*. In this case, the first sequencer 210 may control and monitor an operation of the first set of CGRA engine groups 110*a* and an operation of the CGRA engines 111 included in the first set of CGRA engine groups 110*a*. Similarly, the second sequencer 220 may control and monitor an operation of the second set of CGRA engine groups 110*b* and an operation of the CGRA engines 111 included in the second set of CGRA engine groups 110*b*. The third sequencer 230 may control and monitor an operation of the third set of CGRA engine groups 110*c* and an operation of the CGRA engines 111 included in the third set of CGRA engine groups 110*c*.

In this case, the first sequencer 210, the second sequencer 220, and the third sequencer 230 may control operation of the plurality of CGRA engine groups 110 as upper sequencers. A first lower sequencer 211, a second lower sequencer 221, and a third lower sequencer 231 may be included in each of the plurality of CGRA engine groups 110 and may control operations of a plurality of CGRA engines 111 under each of the plurality of CGRA engine groups 110. The first sequencer 210, the second sequencer 220, and the third sequencer 230 may be respectively associated with the first lower sequencer 211, the second lower sequencer 221, and the third lower sequencer 231.

The sequencers divided into an upper part and a lower part distribute operation control according to each level, and accordingly, overhead may be reduced, and a speed of the entire device may be increased through parallel control.

Figure 12:
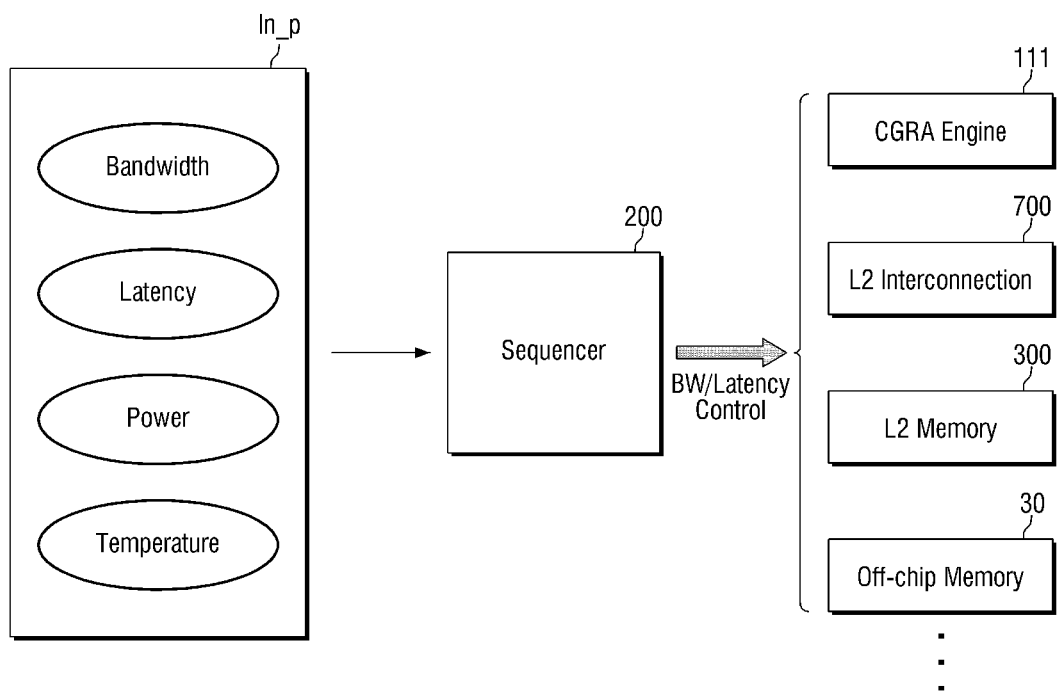
FIG. 12 is a conceptual diagram illustrating an operation of a sequencer of FIG. 5.

FIG. 12 is a conceptual diagram illustrating an operation of the sequencer of FIG. 5.

Referring to FIG. 12, the sequencer 200 may control the at least one CGRA engine 111, the L2 interconnection 700, the L2 memory 300, and the off-chip memory 30 by monitoring an input parameter In_p. The sequencer 200 may control parameters, such as a bandwidth or latency, of the CGRA engine 111, the L2 interconnection 700, the L2 memory 300, and the off-chip memory 30. The sequencer 200 may also control the L1 memory 120, the L1 interconnection 130, and the local interconnection 701. However, for the sake of convenience of description, only the controls of the CGRA engine 111, the L2 interconnection 700, the L2 memory 300, and the off-chip memory 30 are described below.

In this case, the input parameter In_p may include at least one of a bandwidth, latency, supply power, or temperature.

In this case, the bandwidth may indicate a size of data transmission traffic between the CGRA engine 111 and the outside according to time. The bandwidth may be related to a situation of a memory corresponding to the CGRA engine 111, that is, the L2 memory 300 or the off-chip memory 30, the traffic of the L2 interconnection 700 connecting the L2 memory 300 to the off-chip memory 30, or so on.

In this case, latency is one of parameters of calculation performance of the CGRA engine 111 and may mean a period during which a result processed by the CGRA engine 111 is delayed. The latency may be reduced by increasing a frequency of the CGRA engine 111 or increasing supply power of the CGRA engine 111. The supply power and temperature are parameters related to an operating environment of hardware, and performance of the hardware may be increased by controlling the parameters.

The sequencer 200 may control an operation of the at least one CGRA engine 111, the L2 interconnection 700, the L2 memory 300, or the off-chip memory 30 by using the input parameter In_p described above and may solve a performance problem.

Figure 13:
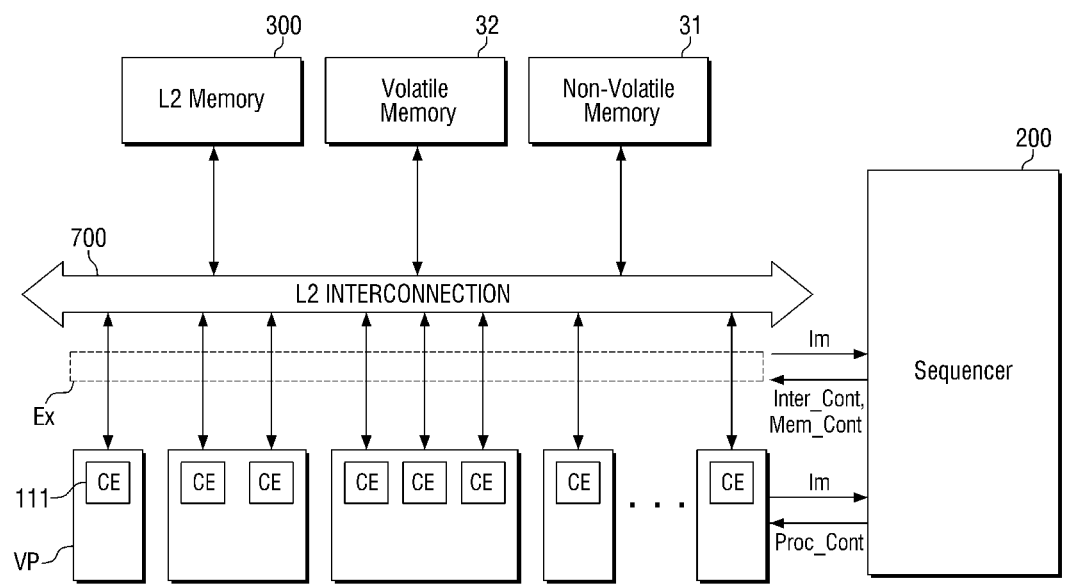
FIG. 13 is a block diagram illustrating monitoring and a control operation of a sequencer of FIG. 5.

FIG. 13 is a block diagram illustrating monitoring and control operations of the sequencer of FIG. 5.

Referring to FIG. 13, the CGRA engine 111 may be mapped to a virtual processor VP. That is, the virtual processor VP may be implemented to efficiently provide necessary hardware resources according to characteristics of an calculation task. Two or more CGRA engines 111 may be mapped to one virtual processor VP, and in this case, the two or more CGRA engines 111 mapped to one virtual processor VP may operate as one unit.

Accordingly, the number of actual CGRA engines 111 may be different from the number of virtual processors VP. In this case, the number of virtual processors VP may be equal to or less than the number of actual CGRA engines 111.

The virtual processor VP may exchange data with the L2 interconnection 700. The data exchange Ex may be recorded through the virtual processor VP and the L2 interconnection 700 and may be monitored by the sequencer 200.

The sequencer 200 may monitor an operation of the CGRA engine 111. In this case, latency, power supply, and temperature of the CGRA engine 111 may be monitored. In addition, the sequencer 200 may monitor a bandwidth between the CGRA engine 111 and the L2 interconnection 700. That is, the sequencer 200 may check the bandwidth by monitoring the data exchange Ex. In this case, the sequencer 200 may receive monitoring information Im in real time. In this case, the monitoring information Im may include at least one of latency of the CGRA engine 111, power supplied to the CGRA engine 111, temperature of the CGRA engine 111, or a bandwidth between the CGRA engine 111 and the L2 interconnection 700.

The sequencer 200 may detect a performance problem by receiving the monitoring information Im. The performance problem may mean that latency or a bandwidth of hardware is detected below a preset reference value. Specifically, the performance problem may be at least one of a constrained bandwidth problem or a constrained calculation performance problem.

In response to this, the sequencer 200 may generate and transmit at least one of a processor control signal Proc_Cont, a memory control signal Mem_Cont, or an interconnection control signal Inter_Cont. The sequencer 200 may transmit at least one of the processor control signal Proc_Cont, the memory control signal Mem_Cont, or the interconnection control signal Inter_Cont to the CGRA engine 111 and the L2 interconnection 700. The processor control signal Proc_Cont, the memory control signal Mem_Cont, and the interconnection control signal Inter_Cont are described in detail below.

Figure 14:
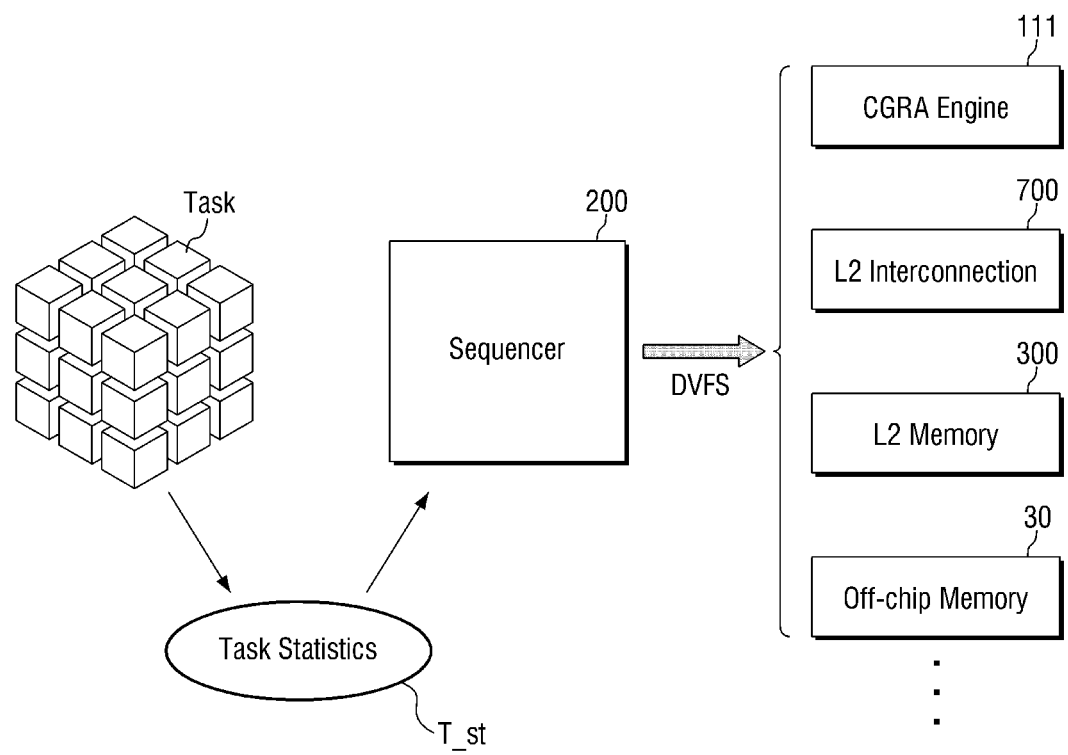
FIG. 14 is a conceptual diagram illustrating dynamic voltage frequency scaling (DVFS) according to work characteristics of a sequencer of FIG. 5.

FIG. 14 is a conceptual diagram illustrating dynamic voltage frequency scaling (DVFS) according to task statistics of the sequencer of FIG. 5.

Referring to FIG. 14, the sequencer 200 may receive characteristics of an input calculation task Task, that is, task statistics T_st. The task statistics T_st may include an operation and an order of the calculation task Task, the type and number of operands, and so on.

The sequencer 200 may optimize hardware performance by adjusting a voltage and/or a frequency in real time when an calculation task is assigned to each CGRA engine 111 according to the task statistics T_st. In this case, the hardware controlled by the sequencer 200 may include the at least one CGRA engine 111, the L2 interconnection 700, the L2 memory 300, or the off-chip memory 30. The hardware controlled by the sequencer 200 may also include at least one of the L1 interconnection 130, the L1 memory 120, or the local interconnection 701.

Figure 15:
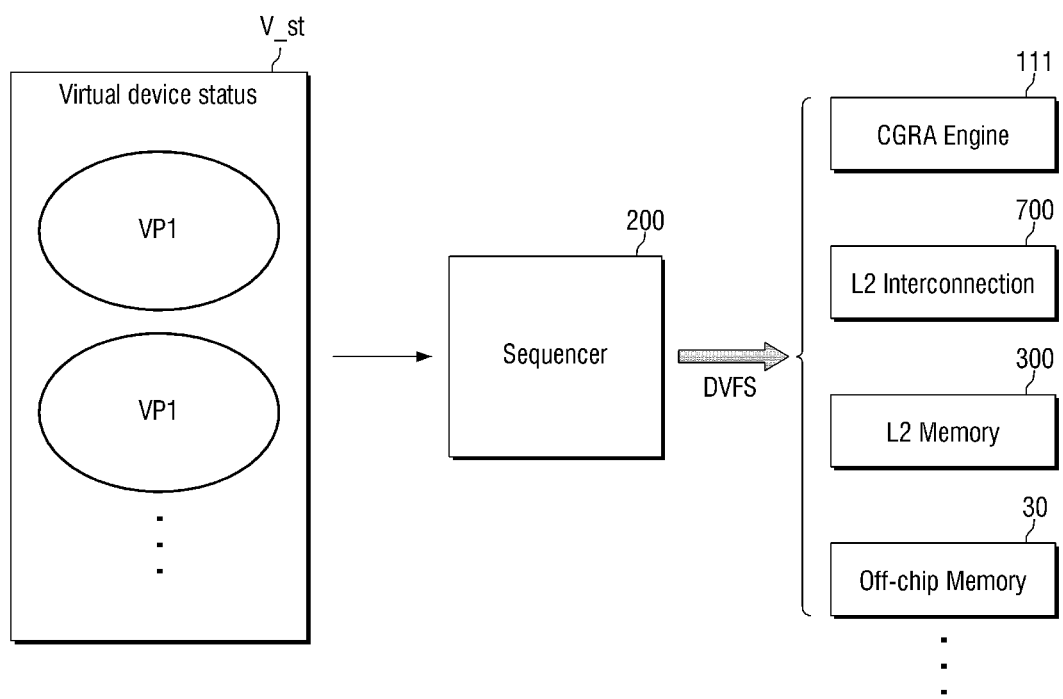
FIG. 15 is a conceptual diagram illustrating DVFS according to a virtual device state of a sequencer of FIG. 5.

FIG. 15 is a conceptual diagram illustrating DVFS according to a virtual device state of the sequencer of FIG. 5.

Referring to FIGS. 13 and 15, the sequencer 200 may receive a status of the virtual processor VP, that is, a virtual device status V_st. The virtual device status V_st may indicate information according to which CGRA engine 111 is being used as which virtual processor VP.

When an calculation task is assigned to each CGRA engine 111 according to the virtual device status V_st, the sequencer 200 may adjust a voltage and/or a frequency in real time to optimize hardware performance. That is, real-time scaling, such as lowering supply power of a memory corresponding to the CGRA engine 111 that is not used in the virtual device status V_st and increasing the supply power to the most actively used CGRA engine 111 or memory, may be performed.

In this case, hardware controlled by the sequencer 200 may include the at least one CGRA engine 111, the L2 interconnection 700, the L2 memory 300, or the off-chip memory 30. The hardware controlled by the sequencer 200 may also include at least one of the L1 interconnection 130, the L1 memory 120, or the local interconnection 701.

Figure 16:
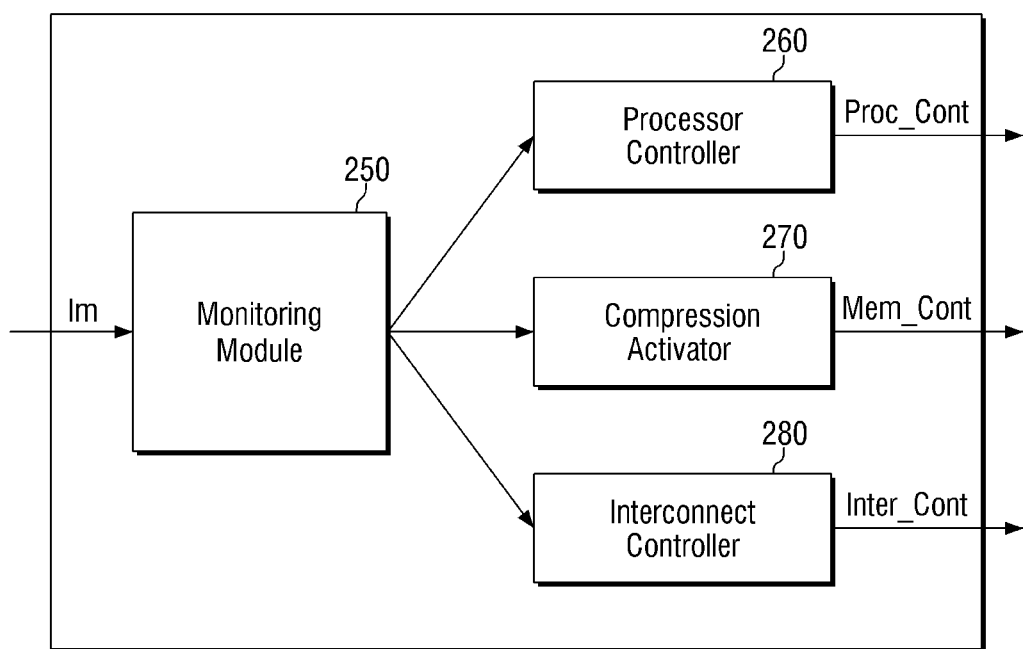
FIG. 16 is a block diagram specifically illustrating a structure of a sequencer of FIG. 5.

FIG. 16 is a block diagram specifically illustrating a structure of the sequencer of FIG. 5.

Referring to FIGS. 13 and 16, the sequencer 200 may include a monitoring module 250, a processor controller 260, a compression activator 270, and an interconnect controller 280.

The monitoring module 250 may receive the monitoring information Im. The monitoring module 250 may detect any performance problem through the monitoring information Im. For example, it is possible to analyze whether bandwidth is constrained or whether calculation performance is constrained. When a bandwidth is constrained or limited, the monitoring module 250 may identify what constrains or limits the bandwidth among the off-chip memory 30, the L2 memory 300, or the L2 interconnection 700.

The processor controller 260 may generate a processor control signal Proc_Cont for controlling supply power or a frequency of the CGRA engine 111 to increase when calculation performance is constrained. The processor controller 260 may transmit the processor control signal Proc_Cont to the CGRA engine 111. In this case, the processor controller 260 may be referred to as a processor controller circuit, but for the sake of convenience, the terms are unified as a processor controller. In addition, the processor controller 260 may be implemented as a circuit or circuitry.

The compression activator 270 may perform compression and decompression of data when a bandwidth is constrained and the off-chip memory 30 or the L2 memory 300 is constrained. That is, when the off-chip memory 30 is constrained, the compression activator 270 may generate a memory control signal Mem_Cont for compressing traffic of the off-chip memory 30 and decompressing the traffic again. Through this, the compression activator 270 may solve a traffic problem of the off-chip memory 30. The memory control signal Mem_Cont may activates a compression engine and a decompression engine to perform compression and decompression. In this case, the compression engine and the decompression engine may be implemented in various ways as general means for compressing and decompressing data. In addition, compression and decompression are only an example of traffic reduction control, and the embodiment is not limited thereto.

In addition, when the L2 memory 300 is constrained, the compression activator 270 may generate the memory control signal Mem_Cont for compressing traffic of the L2 memory 300 and decompressing the traffic again. Through this, the compression activator 270 may solve a traffic problem of the L2 memory 300. In this case, compression and decompression are only an example of traffic downlink control, and the embodiment is not limited thereto. In this case, the compression activator 270 may be referred to as a compression activator circuit, but for the sake of convenience, the terms are unified as a compression activator. In addition, the compression activator 270 may be implemented as a circuit or circuitry.

When a bandwidth is constrained and the off-chip memory 30 or the L2 memory 300 is constrained, the interconnect controller 280 may generate the interconnection control signal Inter_Cont for overdriving a frequency of the L2 interconnection 700. The interconnection control signal Inter_Cont may increase the frequency of the L2 interconnection 700 to solve a bandwidth constraint problem. In this case, the overdrive of the frequency is only an example of interconnection performance enhancement control, and the embodiment is not limited thereto. In this case, the interconnect controller 280 may be referred to as an interconnect controller circuit, but for the sake of convenience, the terms are unified as an interconnect controller. In addition, the interconnect controller 280 may be implemented as a circuit or circuitry.

Figure 17:
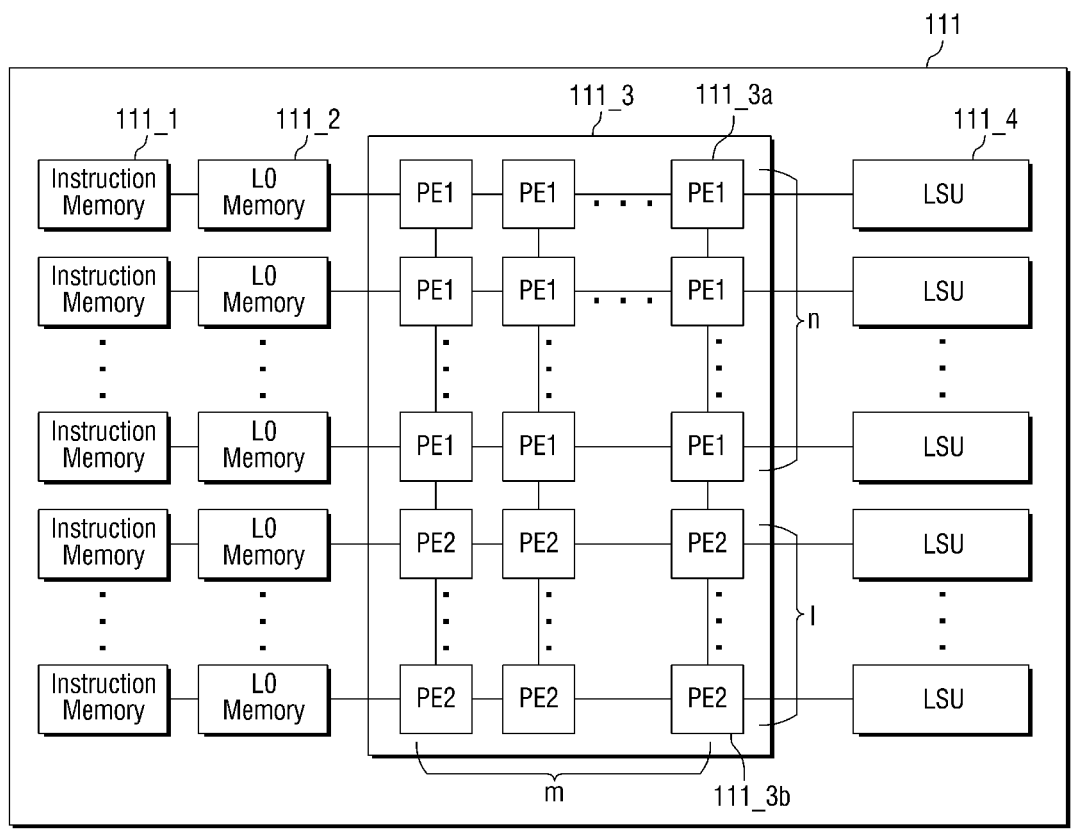
FIG. 17 is a block diagram specifically illustrating a structure of CGRA engine of FIG. 6.

FIG. 17 is a block diagram specifically illustrating a structure of the CGRA engine of FIG. 6.

Referring to FIG. 17, the CGRA engine 111 may include at least one instruction memory 111_1, at least one L0 memory 111_2, a PE array 111_3, and at least one LSU 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

Figure 18:
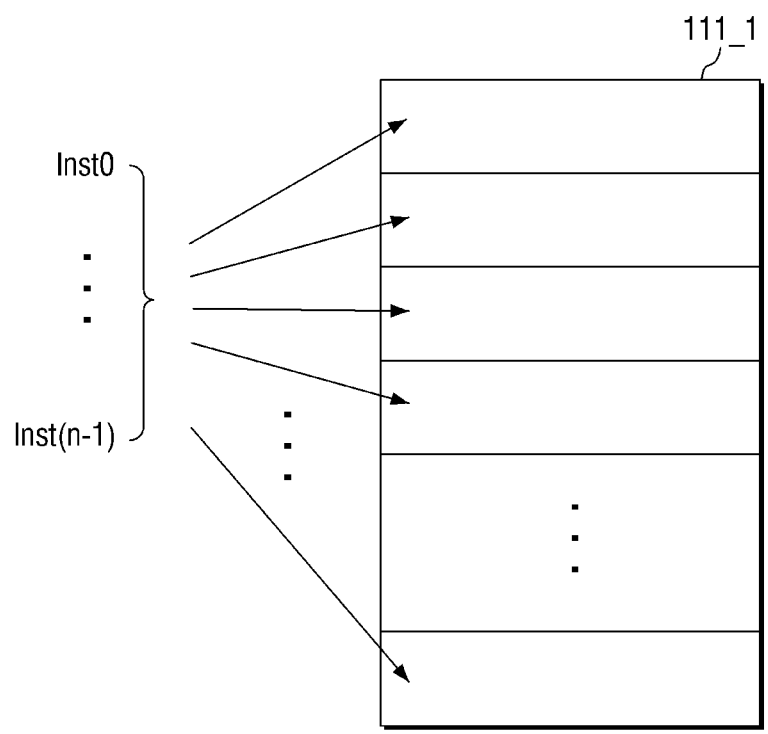
FIG. 18 is a conceptual diagram specifically illustrating an instruction memory of FIG. 17.

FIG. 18 is a conceptual diagram specifically illustrating the instruction memory 111_1 of FIG. 17.

Referring to FIG. 18, the instruction memory 111_1 may receive and store an instruction. The instruction memory 111_1 may sequentially store instructions therein and provide the stored instructions to the PE array 111_3. In this case, the instructions may cause operations of the first type of a plurality of processing elements 111_3a included in the PE array 111_3 to be performed.

Referring again to FIG. 17, the L0 memory 111_2 is located inside the CGRA engine 111 and may receive all input data necessary for an operation of the CGRA engine 111 from the outside and temporarily store the data. In addition, the L0 memory 111_2 may temporarily store output data calculated by the CGRA engine 111 to be transmitted to the outside. The L0 memory 111_2 may serve as a cache memory of the CGRA engine 111.

The L0 memory 111_2 may transmit and receive data to and from the PE array 111_3. The L0 memory 111_2 may be a memory corresponding to L0 (a level 0) lower than L1. In this case, the L0 memory may be a private memory of the CGRA engine 111 that is not shared unlike the L1 memory 120 and the L2 memory 300. The L0 memory 111_2 may transmit data and a program, such as activation or weight, to the PE array 111_3.

The PE array 111_3 may be a module that performs calculation. The PE array 111_3 may perform not only a one-dimensional operation but also a two-dimensional operation or a higher matrix/tensor operation. The PE array 111_3 may include a first type of a plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from the outside through the L1 interconnection 130. The LSU 111_4 may transmit at least one of the received data, the received control signal, or the received synchronization signal to the L0 memory 111_2. Similarly, the LSU 111_4 may transmit at least one of data, a control signal, or a synchronization signal to the outside through the L1 interconnection 130. The LSU 111_4 may be referred to as an LSU circuit, but for the sake of convenience, the terms are unified as an LSU. In addition, the LSU 111_4 may be implemented as a circuit or circuitry.

The CGRA engine 111 may have a CGRA structure. Accordingly, each of the first type of the plurality of processing elements 111_3a and the second type of the plurality of processing elements 111_3b of the PE array 111_3 included in the CGRA engine 111 may be connected to at least one of the L0 memory 111_2, the instruction memory 111_1, or the LSU 111_4. That is, the first type of the plurality of processing elements 111_3a and the second type of the plurality of processing elements 111_3b do not need to be connected to all of the L0 memory 111_2, the instruction memory 111_1, and the LSU 111_4, but may be connected to some thereof.

In addition, the first type of the plurality of processing elements 111_3a may be different types of processing elements from the second type of the plurality of processing elements 111_3b. Accordingly, among the L0 memory 111_2, the instruction memory 111_1, and the LSU 111_4, components connected to the first type of the plurality of processing elements 111_3a may be different from components connected to the second type of the plurality of processing elements 111_3b.

The CGRA engine 111 of the disclosure having a CGRA structure enables a high level of parallel operation and direct data exchange between the first type of the plurality of processing elements 111_3a and the second type of the plurality of processing elements 111_3b, and thus, power consumption may be reduced. In addition, optimization according to various calculation tasks may be performed by including two or more types of processing elements.

For example, when the first type of the plurality of processing elements 111_3a performs a two-dimensional operation, the second type of the plurality of processing element 111_3b may perform a one-dimensional operation. However, the embodiment is not limited thereto. Additionally, the PE array 111_3 may include more types of processing elements. Accordingly, the CGRA structure of the disclosure may be a heterogeneous structure including various types of processing elements.

Figure 19:
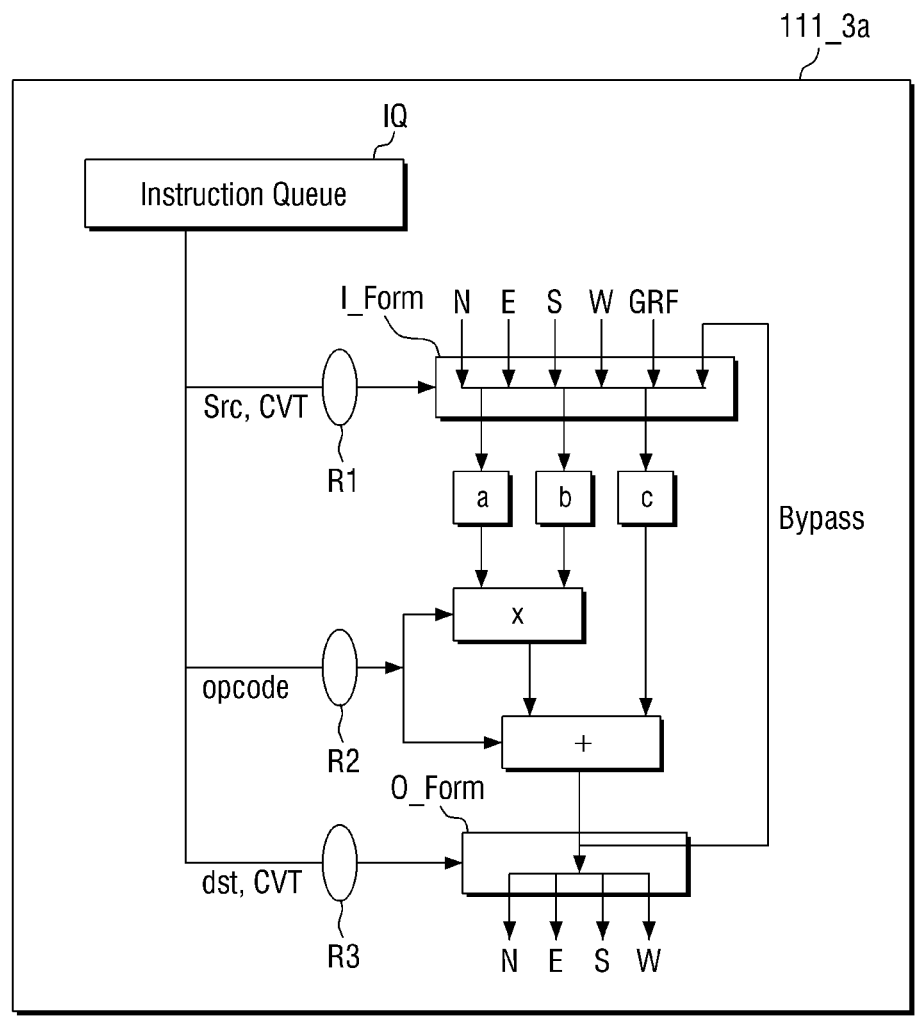
FIG. 19 is a diagram specifically illustrating a processing element of FIG. 17.

FIG. 19 is a diagram specifically illustrating the processing element of FIG. 17.

Referring to FIG. 19, the first type of the plurality of processing elements 111_3a may include an instruction queue IQ, a first register R1, a second register R2, a third register R3, an input formatter I_Form, and an output formatter O_Form.

The instruction queue IQ may receive an instruction received from the instruction memory 111_1, divide the instruction, and sequentially provide the divided instructions to the first register R1, the second register R2, and the third register R3. The first register R1 may receive source information Src and converting information CVT. The second register R2 may receive opcode information opcode. The third register R3 may receive destination information dst and the converting information CVT. The converting information CVT may include information of converting precision.

In this case, the opcode opcode may mean a code of an operation of a corresponding instruction, that is, an operator. The opcode opcode may include, for example, calculation operations, such as ADD, SUB, MUL, DIV, and calculation shift, and logical operations, such as AND, OR, NOT, XOR, logical shift, rotation shift, complement, and clear.

The input formatter I_Form may receive the source information src from the first register R1 to determine an operand. In addition, the input formatter I_Form may receive the converting information CVT from the first register R1 to convert precision of the operand. That is, precision of input data may be different from precision required for calculation, and accordingly, the input formatter I_Form may convert the precision. In this case, the source information src may include at least one of a north N, an east E, a south S, a west W, a global register file GRF, or bypass bypass. The bypass bypass may be a path transmitted from the output formatter O_Form.

The second register R2 may generate an operator by receiving opcode opcode information. The operator may generate an output which is a result of calculation by using an operand. The output formatter O_Form may receive an output. The output formatter O_Form may receive destination information dst from the third register R3 and transmit the output. In addition, the output formatter O_Form may receive the converting information CVT from the third register R3 to convert precision of the output. That is, precision required for calculation may be different from precision required for the output, and accordingly, the output formatter O_Form may convert the precision.

In this case, the destination information dst may include at least one of the north N, the east E, the south S, or the west W. In addition, the output formatter O_Form may transmit the output to the input formatter I_Form through the bypass bypass.

The processing element according to the embodiment may directly perform precision conversion in an instruction queue without having a separate precision conversion device, and accordingly, hardware efficiency may be increased.

Figure 20:
FIG. 20 is a diagram illustrating an instruction set architecture (ISA) of a neural processing device in accordance with some embodiments of the disclosure.

FIG. 20 is a diagram illustrating an instruction set architecture (ISA) of a neural processing device according to some embodiments of the disclosure.

Referring to FIGS. 19 and 20, the ISA of the neural processing device according to some embodiments of the disclosure may include a precision precision, opcode information opcode, pieces of source information src0 to src2, and destination information dst.

The precision precision may be included in the input formatter I_Form and the output formatter O_Form so as to generate the converting information CVT. In other words, information about precision converted may be included in the ISA. The opcode information opcode may be used to determine an operator, the pieces of source information may be used to determine operands, and the destination information may be included in the ISA for transmission of an output.

Figure 21:
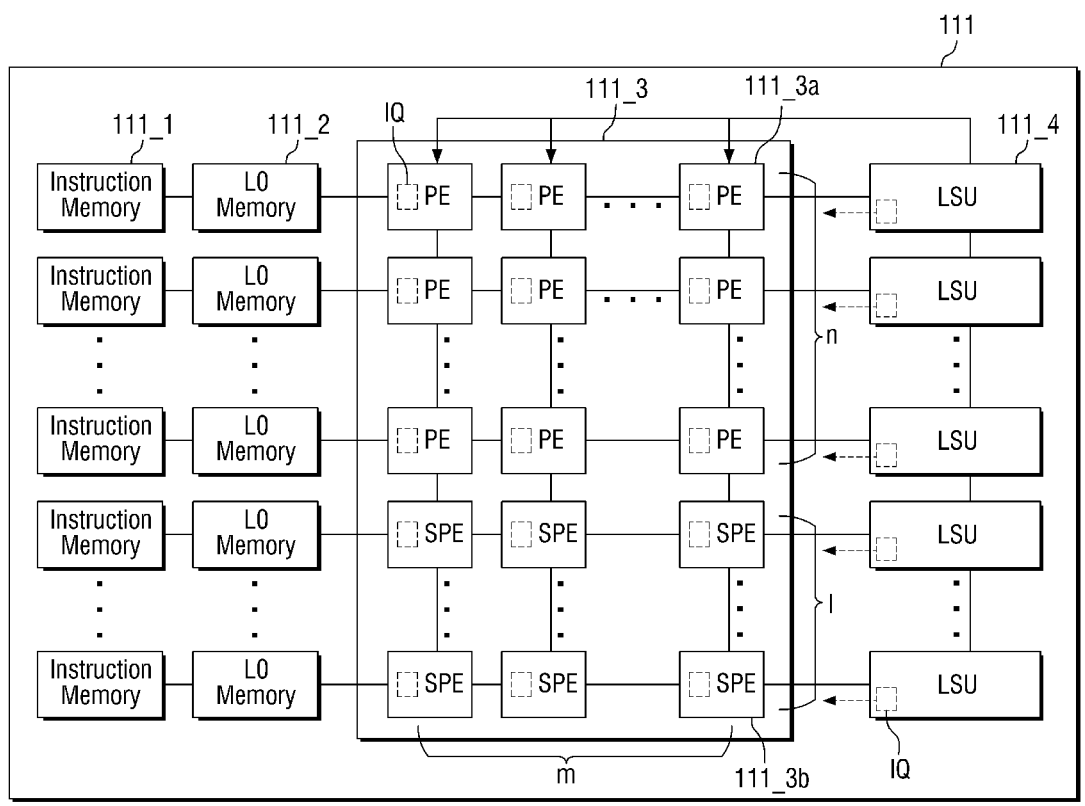
FIG. 21 is a block diagram illustrating an operation of an instruction queue in a CGRA engine of FIG. 6.

FIG. 21 is a block diagram illustrating an operation of an instruction queue of the CGRA engine in FIG. 6.

Referring to FIGS. 19 to 21, the instruction queue IQ may be loaded through the LSU 111_4 and transmitted to the first type of the plurality of processing elements 111_3a and the second type of the plurality of processing elements 111_3b. The first type of the plurality of processing elements 111_3a and the second type of the plurality of processing elements 111_3b may receive instructions and perform calculation tasks.

Figure 22:
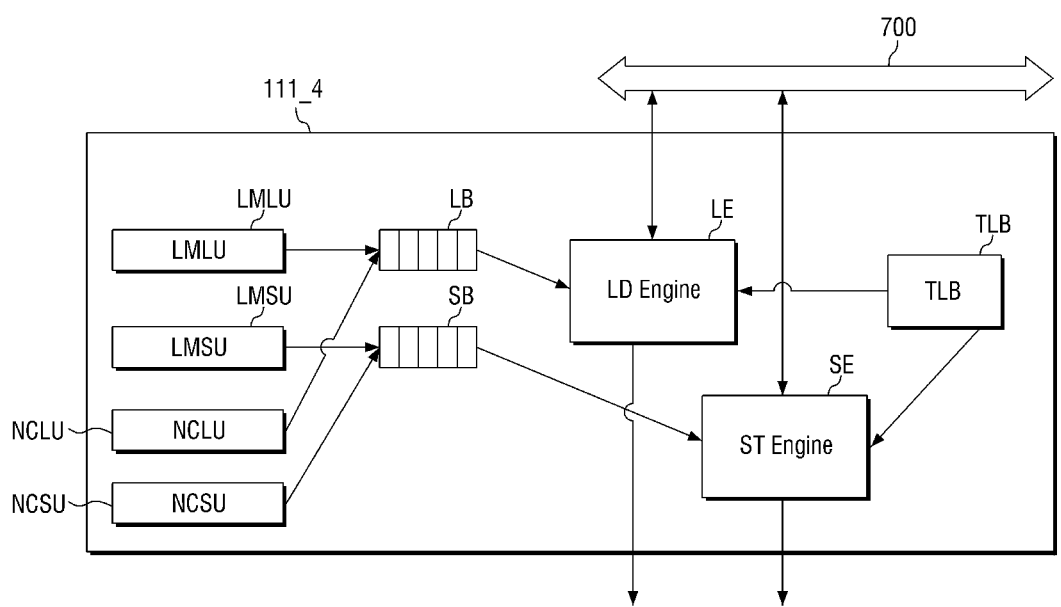
FIG. 22 is a block diagram specifically illustrating a load/store unit (LSU) of FIG. 17.

FIG. 22 is a block diagram specifically illustrating the LSU of FIG. 17.

Referring to FIG. 22, the LSU 111_4 may include a local memory load unit LMLU, a local memory store unit LMSU, a neural core load unit NCLU, a neural core store unit NCSU, a load buffer LB, a store buffer SB, a load engine LE, a store engine SE, and a translation lookaside buffer TLB.

The local memory load unit LMLU, the local memory store unit LMSU, the neural core load unit NCLU, the neural core store unit NCSU, the load engine LE, and the store engine SE may be referred to respectively as a local memory load circuit, a local memory store circuit, a neural core load circuit, a neural core store circuit, a load engine circuit, and a store engine circuit, but may be unified respectively as a local memory load unit, a local memory store unit, a neural core load unit, a neural core store unit, a load engine, and a store engine. In addition, the local memory load unit LMLU, the local memory store unit LMSU, the neural core load unit NCLU, the neural core store unit NCSU, the load engine LE, and the store engine SE may be implemented as circuits (that is, circuits or circuitry).

The local memory load unit LMLU may fetch a load instruction for the L0 memory 111_2 and issue a load instruction. When the local memory load unit LMLU provides the issued load instruction to the load buffer LB, the load buffer LB may sequentially transmit a memory access request to the load engine LE according to an input order.

In addition, the local memory store unit LMSU may fetch a store instruction for the L0 memory 111_2 and issue the store instruction. When the local memory store unit LMSU provides the issued store instruction to the store buffer SB, the store buffer SB may sequentially transmit a memory access request to the store engine SE according to an input order.

The neural core load unit NCLU may fetch a load instruction for the CGRA engine 111 and issue the load instruction. When the neural core load unit NCLU provides the issued load instruction to the load buffer LB, the load buffer LB may sequentially transmit a memory access request to the load engine LE according to an input order.

In addition, the neural core store unit NCSU may fetch a store instruction for the CGRA engine 111 and issue the store instruction. When the neural core store unit NCSU provides the issued store instruction to the store buffer SB, the store buffer SB may sequentially transmit a memory access request to the store engine SE according to an input order.

The load engine LE may receive a memory access request and load data through the L2 interconnection 700. In this case, the load engine LE may quickly find data by using a translation table of a recently used virtual address and a recently used physical address in the translation lookaside buffer TLB. When the virtual address of the load engine LE is not in the translation lookaside buffer TLB, address translation information may be found in another memory.

The store engine SE may receive a memory access request and load data through the L2 interconnection 700. In this case, the store engine SE may quickly find data by using a translation table of a recently used virtual address and a recently used physical address in the translation lookaside buffer TLB. When the virtual address of the store engine SE is not in the translation lookaside buffer TLB, address translation information may be found in other memory.

Figure 23:
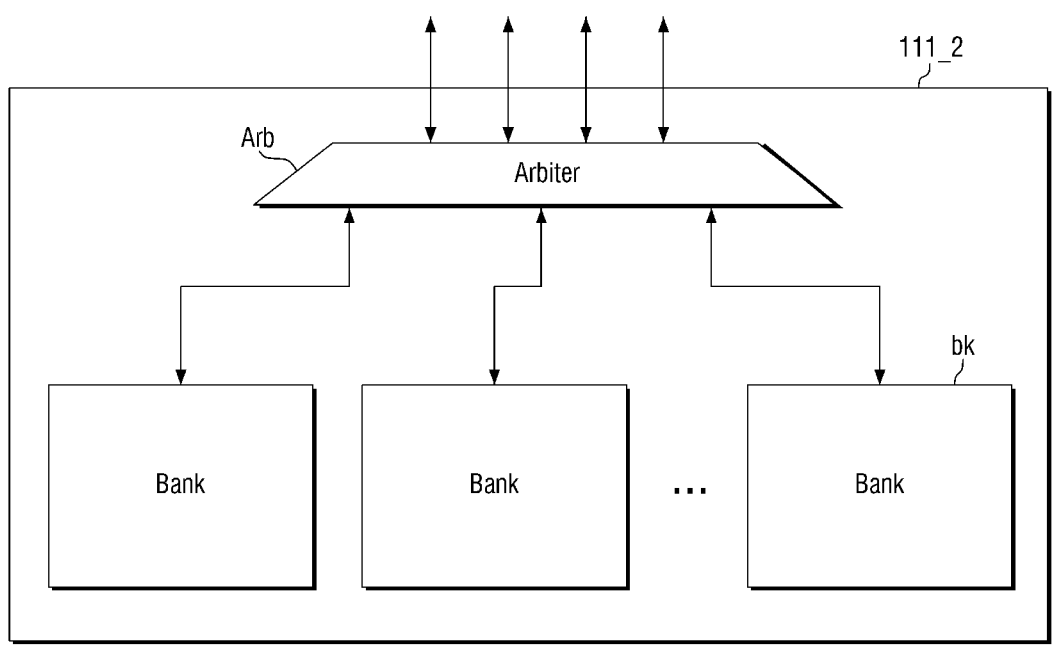
FIG. 23 is a block diagram specifically illustrating an L0 memory of FIG. 17.

FIG. 23 is a block diagram specifically illustrating the L0 memory of FIG. 17.

Referring to FIG. 23, the L0 memory 111_2 may include an arbiter Arb and at least one memory bank bk.

When data is stored in the L0 memory 111_2, the arbiter Arb may receive data from the load engine LE. In this case, the data may be allocated to the memory bank bk in a round robin manner. Accordingly, the data may be stored in any one of the at least one memory bank bk.

In contrast to this, when data is loaded to the L0 memory 111_2, the arbiter Arb may receive data from the memory bank bk and transmit the data to the store engine SE. The store engine SE may store data in the outside through the local interconnection 701.

Figure 24:
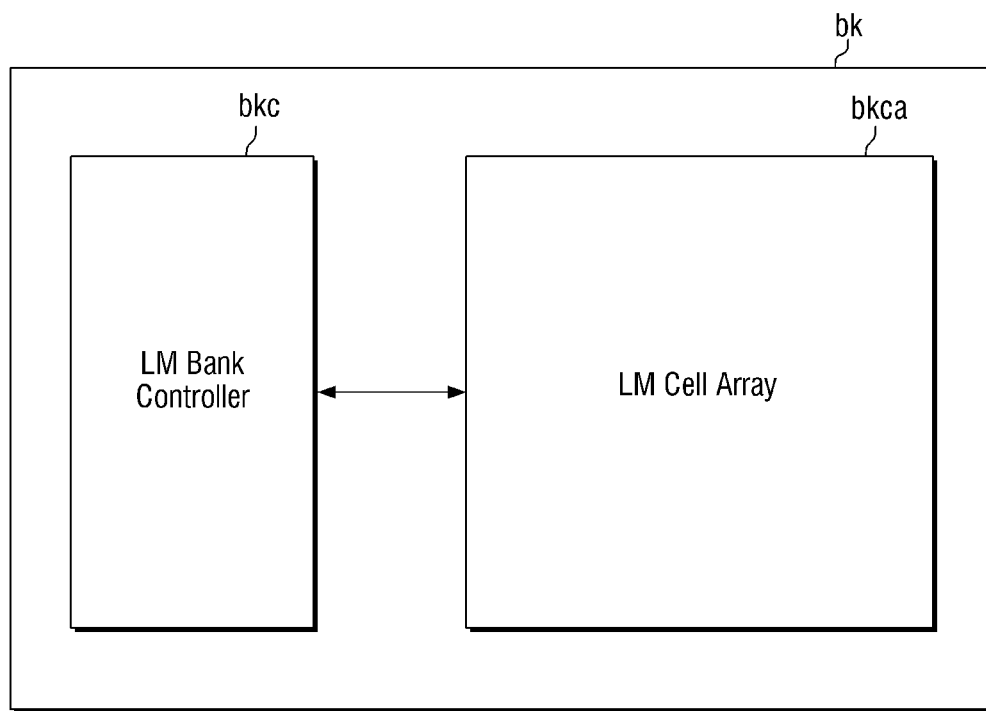
FIG. 24 is a block diagram specifically illustrating an L0 memory bank of FIG. 23.

FIG. 24 is a block diagram specifically illustrating the L0 memory bank bk of FIG. 23.

Referring to FIG. 24, the memory bank bk may include a bank controller bkc and a bank cell array bkca.

The bank controller bkc may manage read and write operations through addresses of data stored in the memory bank bk. That is, the bank controller bkc may manage the input/output of data as a whole.

The bank cell array bkca may have a structure in which memory cells directly storing data are aligned in rows and columns. The bank cell array bkca may be controlled by the bank controller bkc.

Figure 25:
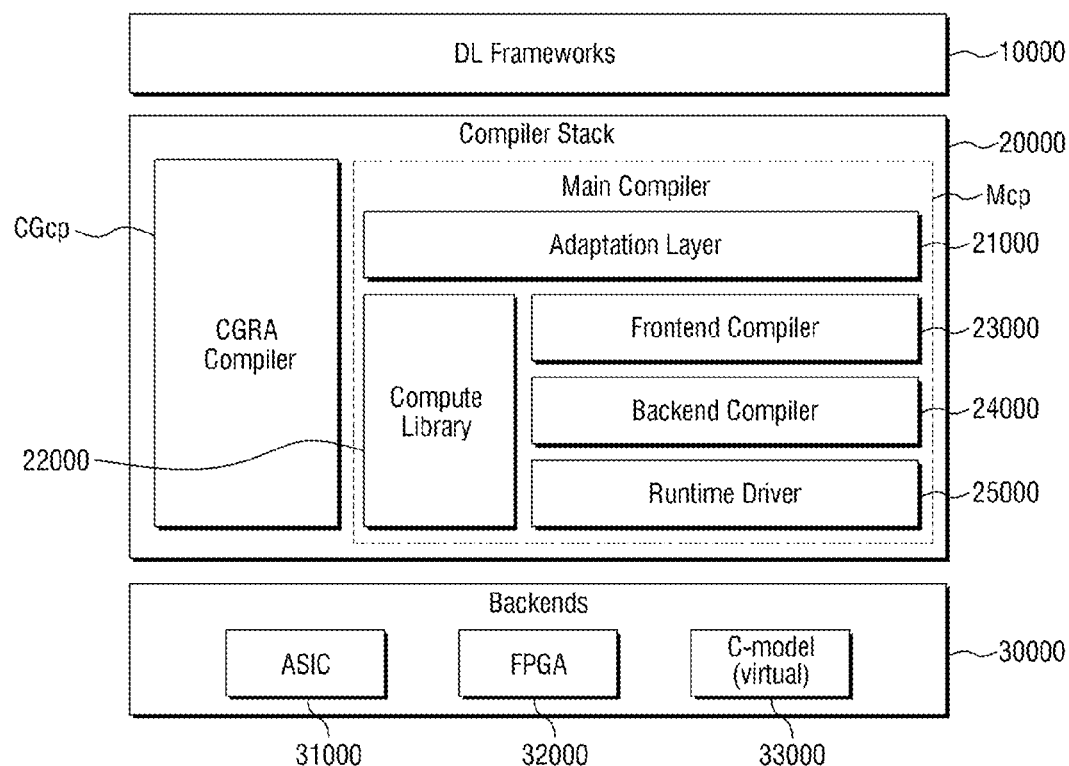
FIG. 25 is a block diagram for illustrating a software hierarchy of a neural processing device in accordance with some embodiments of the disclosure.

FIG. 25 is a block diagram for illustrating a software hierarchy of a neural processing device in accordance with some embodiments of the disclosure.

Referring to FIG. 25, the software hierarchy of the neural processing device in accordance with some embodiments may include a deep learning (DL) framework 10000, a compiler stack 20000, and a back-end module 30000.

The DL framework 10000 may refer to a framework for a deep learning model network used by a user. For example, a trained neural network, that is, a deep learning graph, may be generated by using a program, such as TensorFlow or PyTorch. The deep learning graph may be represented in a code form of a calculation task.

The compiler stack 20000 may include a CGRA compiler CGcp and a main compiler Mcp. The CGRA compiler CGcp may perform CGRA engine level compilation. That is, the CGRA compiler CGcp may perform internal optimization of the CGRA engine 111. The CGRA compiler CGcp may store calculation codes in a compute library 22000 through the CGRA engine level compilation.

Unlike this, the main compiler Mcp may perform L2 level compilation, that is, CGRA engine group level compilation. That is, the main compiler Mcp may perform compilation, such as task scheduling, between the CGRA engine groups 110, the L2 memory 300, and the L2 interconnection 700. The embodiment may perform optimization twice through CGRA compilation and main compilation.

The main compiler Mcp may include an adaptation layer 21000, a compute library 22000, a frontend compiler 23000, a backend compiler 24000, and a runtime driver 25000.

The adaptation layer 21000 may be in contact with the DL framework 10000. The adaptation layer 21000 may quantize a user's neural network model generated by the DL framework 10000, that is, a deep learning graph, and generate a quantization model. In addition, the adaptation layer 21000 may convert a type of a model into a required type. The quantization model may also have a form of the deep learning graph.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store a template operation designed in a form suitable for hardware among various operations. The compute library 22000 may provide the backend compiler 24000 with several template operations that require hardware to generate optimized codes. In this case, the compute library 22000 may receive an calculation code from the CGRA compiler CGcp and store the calculation code as a template operation. Accordingly, in the embodiment, the previously optimized template operation may be optimized again through the backend compiler 24000, and accordingly, it is regarded optimization is performed twice.

The runtime driver 25000 may continuously perform monitoring during driving, thereby making it possible to drive the neural network device in accordance with some embodiments. Specifically, it may be responsible for the execution of an interface of the neural network device.

Unlike FIG. 25, the CGRA compiler CGcp may also be located inside the compute library 22000. The CGRA compiler CGcp may also store calculation codes in the compute library 22000 through the CGRA engine level compilation in the compute library 22000. In this case, the main compiler Mcp may internally perform the optimization twice.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 26:
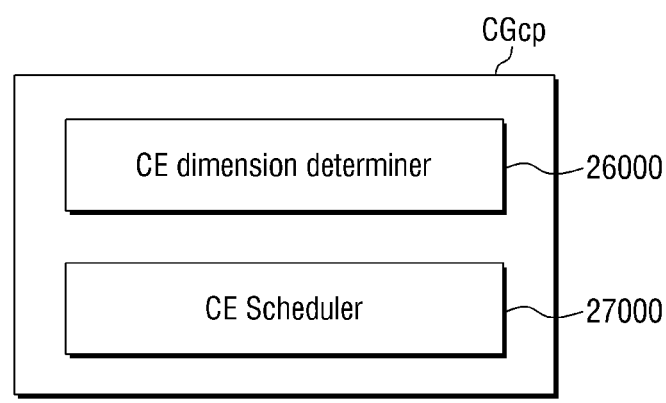
FIG. 26 is a block diagram specifically illustrating a structure of a CGRA compiler of FIG. 25.

FIG. 26 is a block diagram specifically illustrating a structure of the CGRA compiler of FIG. 25.

Referring to FIGS. 7 and 26, the CGRA compiler CGep may include a CGRA engine (CE) dimension determiner 26000 and a CE scheduler 27000. In this case, the CE dimension determiner 26000 and the CE scheduler 27000 may be referred to respectively as a CE dimension determiner circuit and a CE scheduler circuit, but for the sake of convenience, the terms are respectively unified as the CE dimension determiner and the CE scheduler. In addition, the CE dimension determiner 26000 and the CE scheduler 27000 may each be implemented as a circuit or circuitry The CE dimension determiner 26000 may determine a scale of the CGRA engine 111 according to an input calculation task. That is, the CE dimension determiner 26000 may determine the number of the first type of the plurality of processing elements 111_3a and the second type of the plurality of processing elements 111_3b included in the CGRA engine 111 to perform an optimal calculation task.

Furthermore, the CE dimension determiner 26000 may also determine the number of CGRA engines 111 included in the CGRA engine groups 110. That is, a dimension of the CGRA engine 111 and a dimension of the CGRA engine groups 110 may be determined, and a unit structure and a cluster structure of the final hierarchical structure may be determined.

The CE scheduler 27000 may perform CE level scheduling. The CE scheduler 27000 may perform task scheduling of the first type of the plurality of processing elements 111_3a and the second type of the plurality of processing elements 111_3b included in the CGRA engine 111. Accordingly, an calculation code for calculation of each task may be generated.

Figure 27:
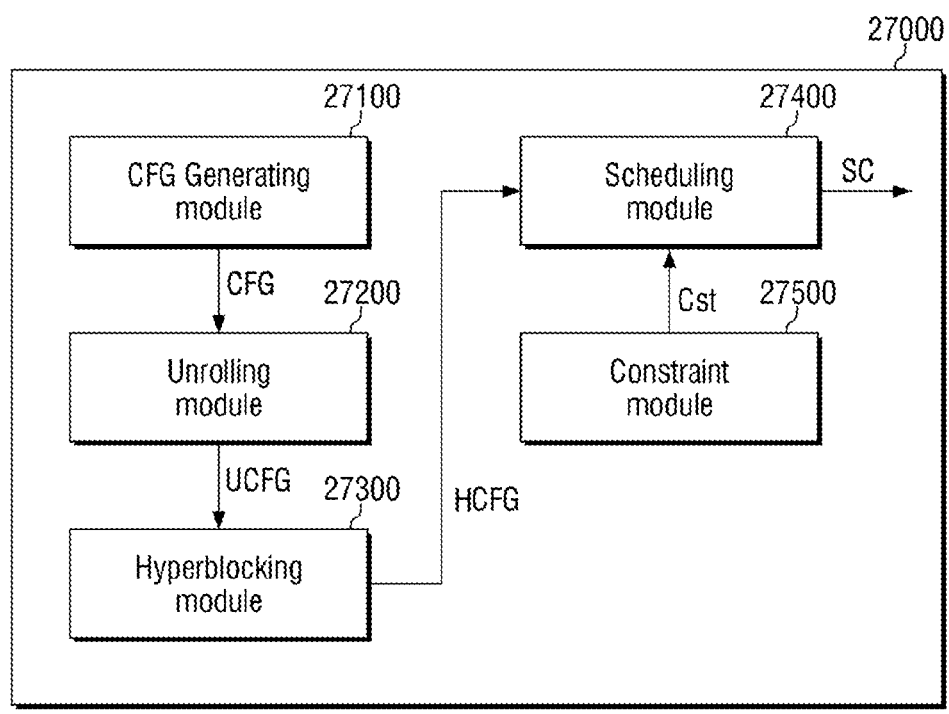
FIG. 27 is a block diagram specifically illustrating a structure of a CGRA engine scheduler of FIG. 26.

FIG. 27 is a block diagram specifically illustrating a structure of the CGRA engine scheduler of FIG. 26.

Referring to FIG. 27, a CGRA engine scheduler 27000 may include a control flow graph (CFG) generating module 27100, an unrolling module 27200, a hyperblocking module 27300, a constraint module 27500, and a scheduling module 27400.

In this case, the CFG generating module 27100, the unrolling module 27200, the hyperblocking module 27300, the constraint module 27500, and the scheduling module 27400 may be referred to respectively as a CFG generating module circuit, an unrolling module circuit, a hyperblocking module circuit, a constraint module circuit, and a scheduling module circuit, but for the sake of convenience, the terms are unified respectively as a CFG generating module, an unrolling module, a hyperblocking module, a constraint module, and a scheduling module. In addition, the CFG generating module 27100, the unrolling module 27200, the hyperblocking module 27300, the constraint module 27500, and the scheduling module 27400 may each be implemented as a circuit or circuitry.

The CFG generating module 27100 may receive a deep learning graph from the deep learning DL framework 10000. The deep learning graph may be represented in the form of code written by a DL framework. The CFG generating module 27100 may convert the deep learning graph into a control flow graph CFG composed of nodes and edges of an operation unit. The control flow graph CFG may include a loop that is repeatedly processed a specified number of times or may also include a conditional branch structure that branches according to conditions.

The unrolling module 27200 may unroll a loop included in the control flow graph CFG. Additionally, the unrolling module may perform roof filling and roof flattening and inlining. The unrolling module 27200 may generate an unrolling control flow graph UCFG by unrolling the loop included in the control flow graph CFG.

The hyperblocking module 27300 may generate a hyperblock by receiving the unrolling control flow graph UCFG and reconstructing a conditional branch structure. A hyperblock may be generated by merging blocks with the same condition among different blocks. The hyperblocking module 27300 may generate a hyperblocking control flow graph HCFG.

The constraint module 27500 may store hardware constraint Cst generated based on knowledge of experts previously prepared. The hardware constraint Cst may include information previously designed by optimizing a specific operation. That is, the hardware constraint may act as a guideline on how to reconfigure the CGRA engine 111 when performing a specific input operation.

The scheduling module 27400 may receive the hyperblocking control flow graph HCFG and receive the hardware constraint Cst. The scheduling module 27400 may generate an calculation code SC by converting the hyperblocking control flow graph HCFG based on the hardware constraint Cst.

Figure 28:
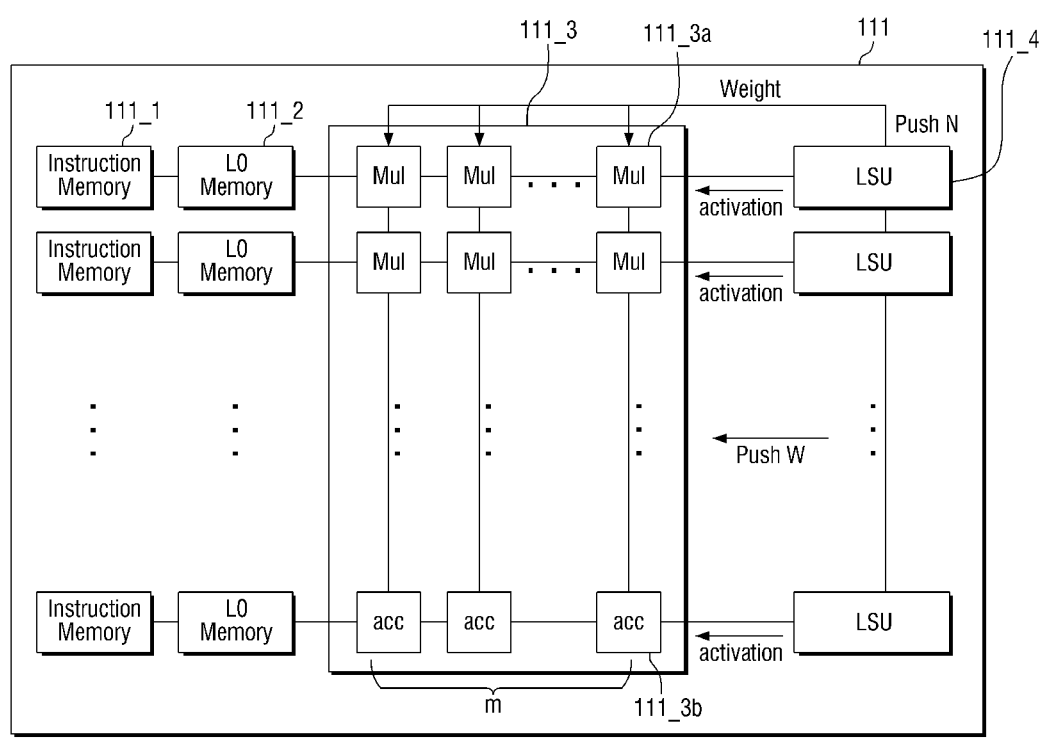
FIG. 28 is a block diagram illustrating a CGRA engine compiled according to a constraint module of FIG. 27.

FIG. 28 is a block diagram illustrating a CGRA engine compiled according to a constraint module of FIG. 27.

Referring to FIG. 28, the PE array 111_3 of the CGRA engine 111 may configure a first type of the plurality of processing element 111_3a as a multiplier and configure the second type of the plurality of processing element 111_3b as an accumulator when performing matrix multiplication. The configurations may be established through a history of existing hardware implementation. That is, the hardware constraint Cst may provide a guide on how operands and operators should be configured.

Figure 29:
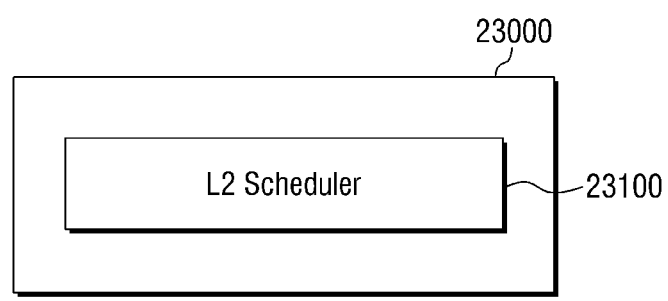
FIG. 29 is a block diagram specifically illustrating a structure of a frontend compiler of FIG. 25.

FIG. 29 is a block diagram specifically illustrating a structure of the frontend compiler of FIG. 25.

Referring to FIG. 29, the frontend compiler 23000 may include an L2 scheduler 23100.

The L2 scheduler 23100 may perform L2 level scheduling, that is, CGRA engine group level scheduling. That is, the L2 scheduler 23100 may receive a deep learning graph and perform scheduling at levels of the CGRA engine cluster 100 and the CGRA engine groups 110 by tiling an calculation task. The embodiment may maximize optimization efficiency because there are both the CGRA engine level scheduling and the CGRA engine group level scheduling. The L2 scheduler 23100 may be referred to as an L2 scheduler circuit, but for the sake of convenience, the terms are unified as an L2 scheduler. In addition, the L2 scheduler 23100 may be implemented as a circuit or circuitry.

Figure 30:
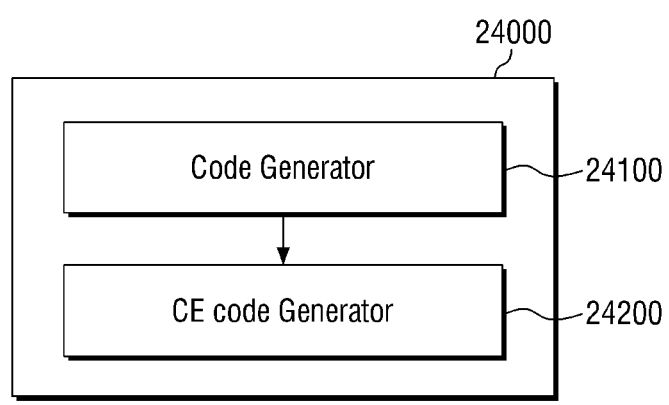
FIG. 30 is a block diagram specifically illustrating a structure of a backend compiler of FIG. 25.

FIG. 30 is a block diagram specifically illustrating a structure of the backend compiler of FIG. 25.

Referring to FIG. 30, the backend compiler 24000 may include a code generator 24100 and a CE code generator 24200. The code generator 24100 and the CE code generator 24200 may be referred to respectively as a code generator circuit and a CE code generator circuit, but for the sake of convenience, the terms are respectively unified as a code generator and a CE code generator. In addition, the code generator 24100 and the CE code generator 24200 may be implemented as circuits or circuitry.

The code generator 24100 may refer to the compute library 22000. The code generator 24100 may generate partial binary codes based on the calculation code SC stored in the compute library 22000. The partial binary codes may constitute a binary code by being added to each other later. The calculation code SC is stored based on an operation, and accordingly, the partial binary codes may also be generated based on an operation.

The CE code generator 24200 may receive the partial binary codes. The CE code generator 24200 may generate a final binary code by summing several partial binary codes. The CE code generator 24200 may transmit the binary code to the runtime driver 25000.

Figure 31:
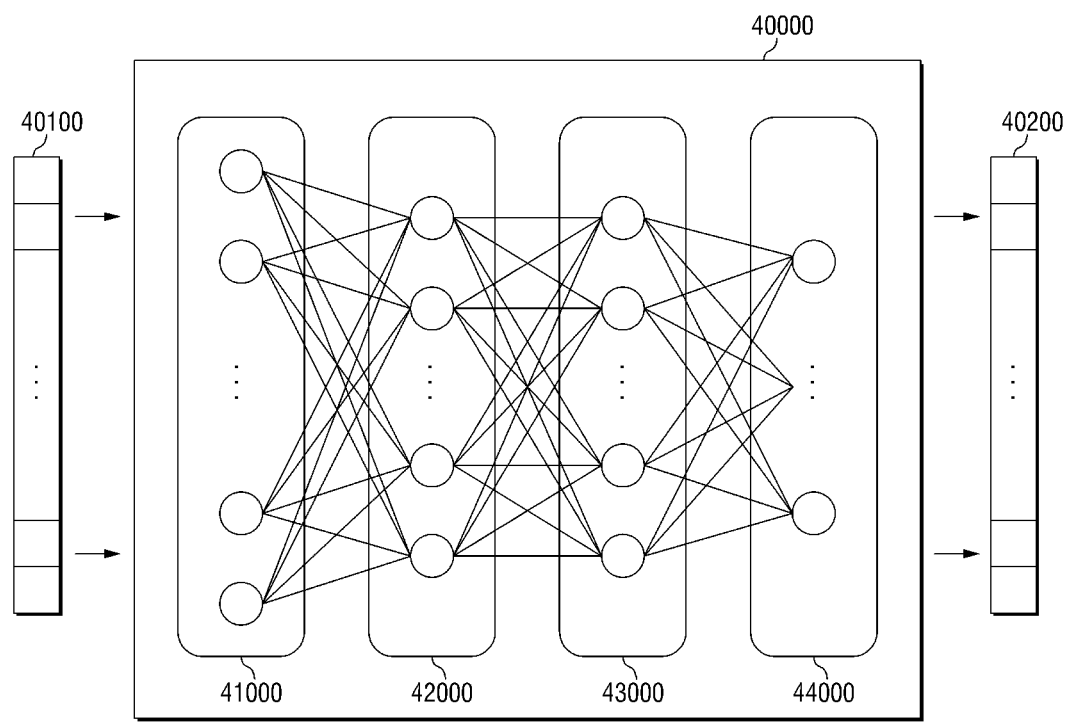
FIG. 31 is a conceptual diagram for illustrating deep learning calculations performed by a neural processing device in accordance with some embodiments of the disclosure.

FIG. 31 is a conceptual diagram for illustrating deep learning calculations performed by a neural processing device in accordance with some embodiments of the disclosure.

Referring to FIG. 31, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image, and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 25, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 32:
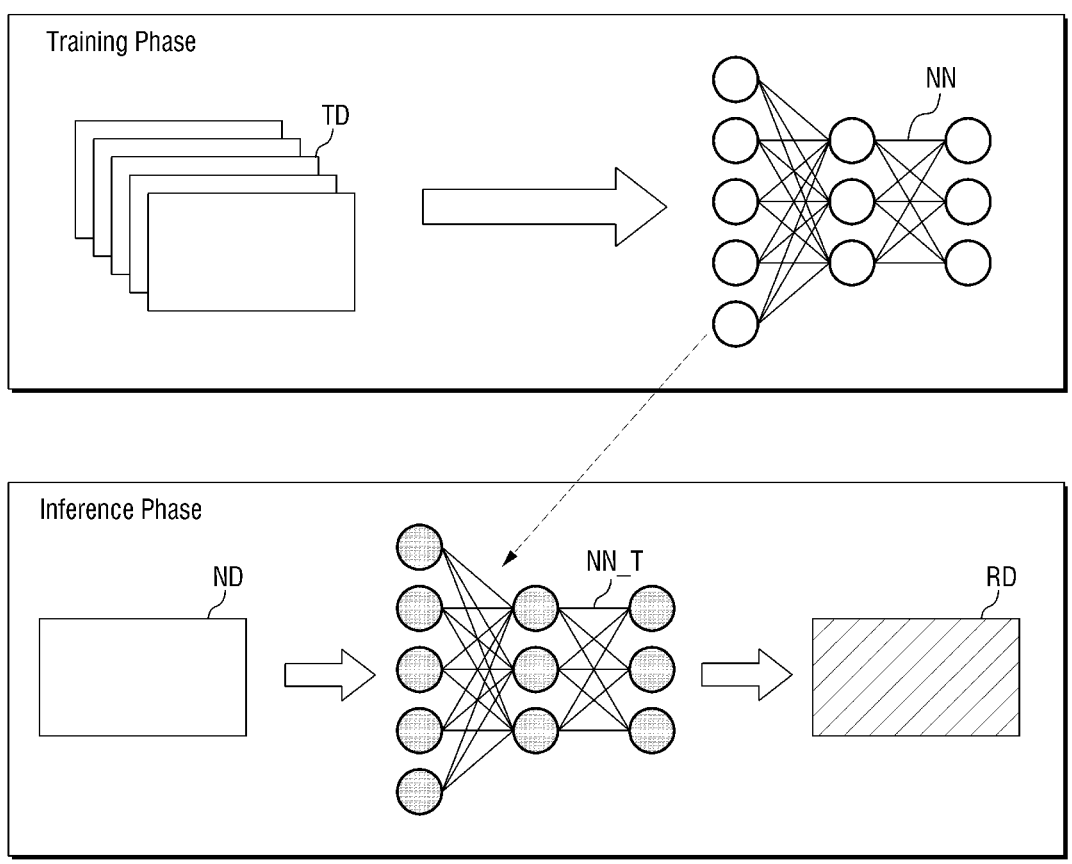
FIG. 32 is a conceptual diagram for illustrating training and inference operations of a neural network of a neural processing device in accordance with some embodiments of the disclosure.

FIG. 32 is a conceptual diagram for illustrating training and inference operations of a neural network of a neural processing device in accordance with some embodiments of the disclosure.

Referring to FIG. 32, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

Referring to FIG. 32, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

Hereinafter, a control method of a neural processing device, according to some embodiments of the disclosure will be described with reference to FIGS. 13, 16, and 33. Descriptions previously given with reference to FIGS. 1 to 32 are omitted or simplified.

Figure 33:
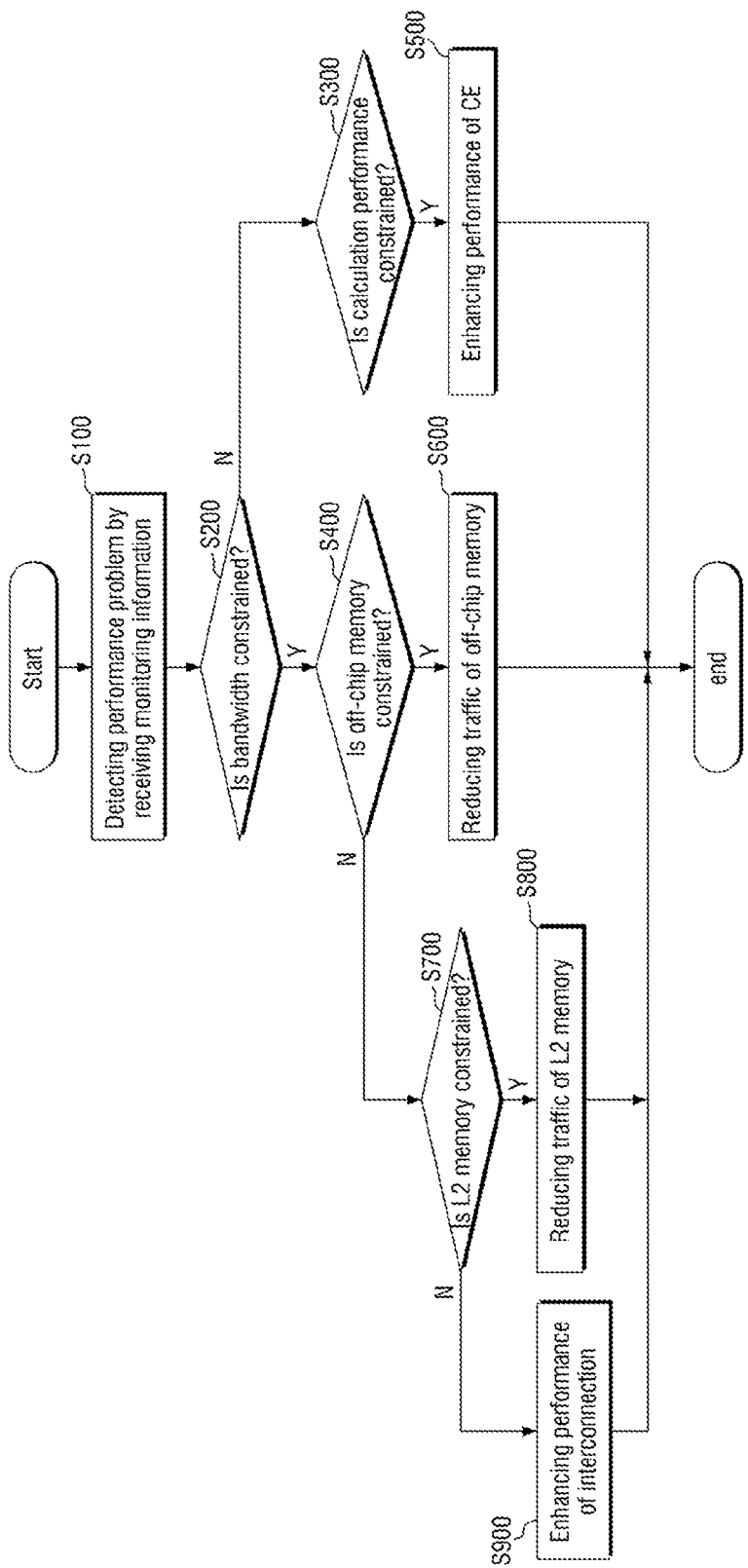
FIG. 33 is a flowchart illustrating a control method of a neural processing device, in accordance with some embodiments of the disclosure.

FIG. 33 is a flowchart illustrating a control method of a neural processing device, according to some embodiments of the disclosure.

Referring to FIG. 33, the neural processing device may receive monitoring information and detect a performance problem at S100.

Specifically, referring to FIGS. 13 and 16, the sequencer 200 may detect the performance problem by receiving the monitoring information Im. Specifically, the performance problem may be at least one of a bandwidth constraint problem or an calculation performance constraint problem.

The monitoring module 250 may receive the monitoring information Im. The monitoring module 250 may detect any performance problem through the monitoring information Im. For example, the monitoring module 250 may analyze whether a bandwidth is constrained or calculation performance is constrained. When the bandwidth is constrained, the monitoring module 250 may identify whether the off-chip memory 30 is constrained, the L2 memory 300 is constrained, or the L2 interconnection 700 is constrained.

Referring again to FIG. 33, the monitoring module 250 may determine whether the bandwidth is constrained at S200.

When the bandwidth is not constrained, the monitoring module 250 may determine whether calculation performance is constrained at S300. When the calculation performance is constrained, control for increasing performance of CGRA engine may be performed at S500.

Specifically, referring to FIG. 16, the processor controller 260 may generate the processor control signal Proc_Cont for controlling an increase of power supply or a frequency of the CGRA engine 111 when the calculation performance is constrained. The processor controller 260 may transmit the processor control signal Proc_Cont to the CGRA engine 111.

Referring again to FIG. 33, when the bandwidth is constrained in step S200, the monitoring module 250 may determine whether the off-chip memory is constrained at S400. When the off-chip memory is constrained, control for reducing traffic of the off-chip memory may be performed at S600.

Specifically, referring to FIG. 16, the compression activator 270 may generate the memory control signal Mem_Cont that performs compression of the traffic of the off-chip memory 30 and decompresses the traffic again when the off-chip memory 30 is constrained. Through this, the compression activator 270 may solve a traffic problem of the off-chip memory 30. The memory control signal Mem_Cont may activate a compression engine or a decompression engine to perform compression or decompression. In this case, the compression and decompression are only examples of traffic reduction control, and the embodiment is not limited thereto.

Referring again to FIG. 33, when the off-chip memory is not constrained in step S400, the monitoring module 250 may determine whether the L2 memory is constrained at S700. When the L2 memory is constrained, control for reducing traffic of the L2 memory may be performed at S800.

Specifically, referring to FIG. 16, when the L2 memory 300 is constrained, the compression activator 270 may generate the memory control signal Mem_Cont for compressing the traffic of the L2 memory 300 and decompresses the traffic again. Through this, the compression activator 270 may solve the traffic problem of the L2 memory 300. In this case, compression and decompression are only examples of traffic reduction control, and the embodiment is not limited thereto.

Referring again to FIG. 33, when the L2 memory is not constrained in step S700, control for increasing performance of interconnection is performed at S900.

Specifically, referring to FIG. 16, the interconnect controller 280 may generate the interconnection control signal Inter_Cont for overdriving a frequency of the L2 interconnection 700 when the bandwidth is constrained and the off-chip memory 30 or the L2 memory 300 is constrained. The interconnection control signal Inter_Cont may increase the frequency of the L2 interconnection 700 to solve a bandwidth constraint problem. In this case, the frequency overdrive is only one example of interconnection performance enhancement control, and the embodiment is not limited thereto.

Hereinafter, a control method of a neural processing device, according to some embodiments of the disclosure will be described with reference to FIGS. 25 to 27, FIG. 29, and FIGS. 34 to 37. Descriptions previously given with reference to FIGS. 1 to 33 are omitted or simplified.

Figure 34:
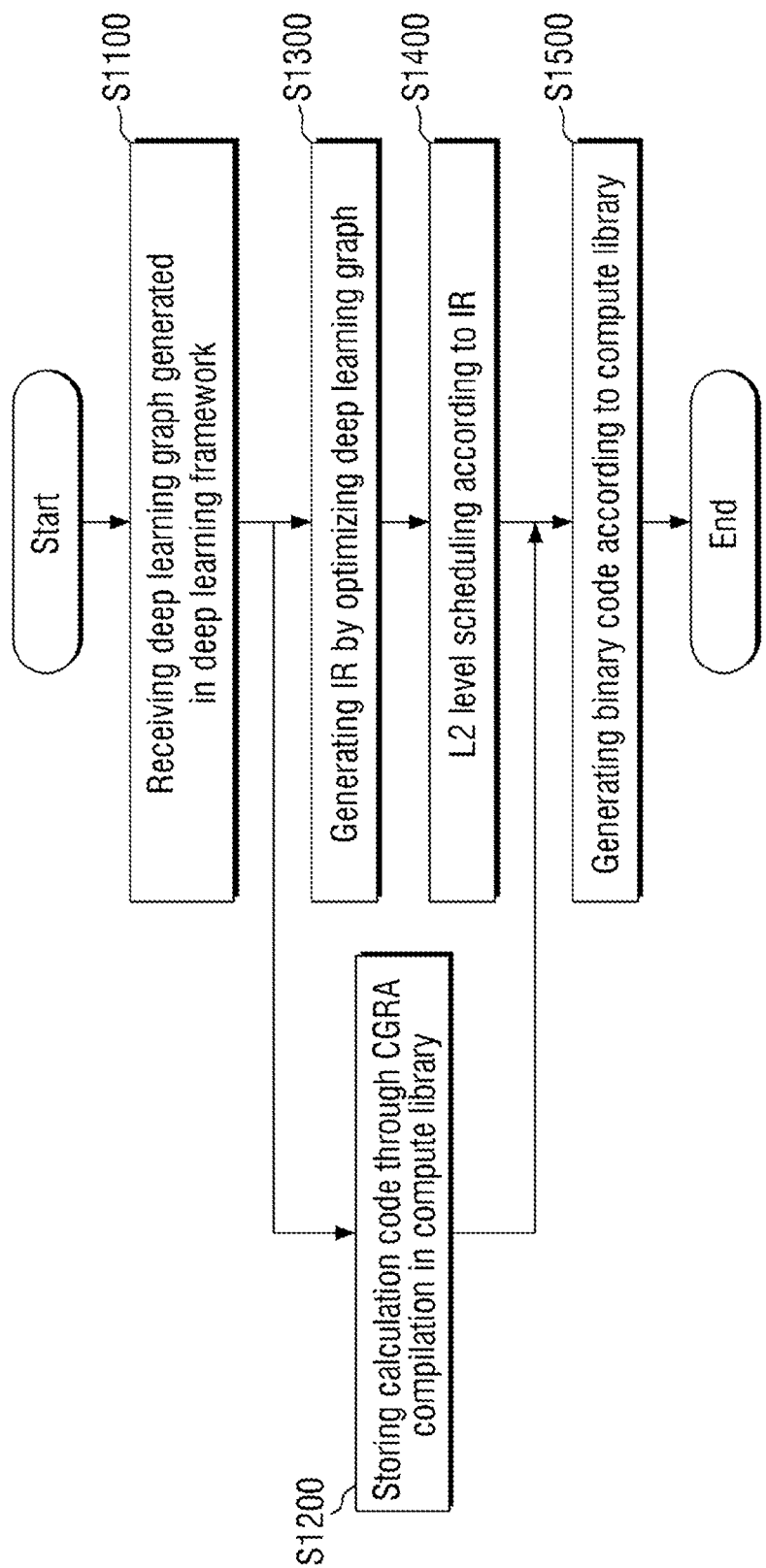
FIG. 34 is a flowchart illustrating a compiling method of a neural processing device, in accordance with some embodiments of the disclosure.
Figure 35:
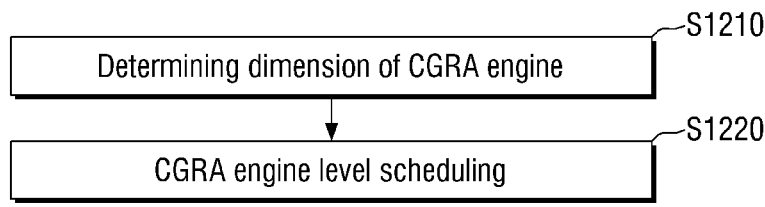
FIG. 35 is a flowchart specifically illustrating the storing of FIG. 34.
Figure 36:
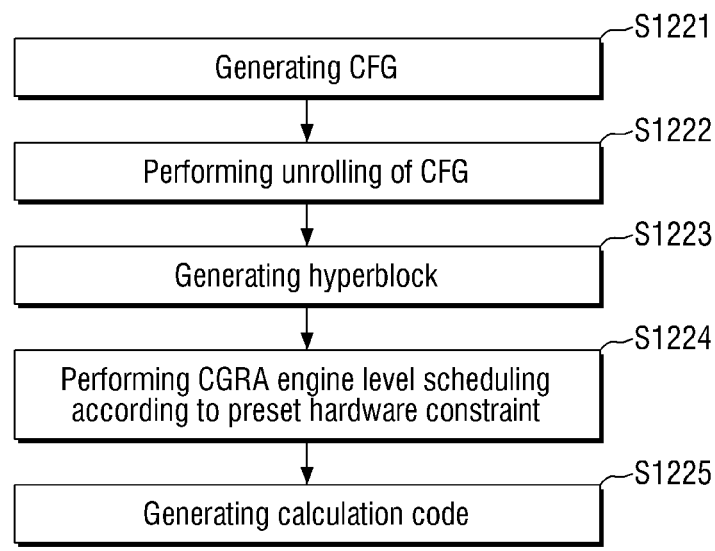
FIG. 36 is a flowchart specifically illustrating the scheduling of the storing of FIG. 35.
Figure 37:
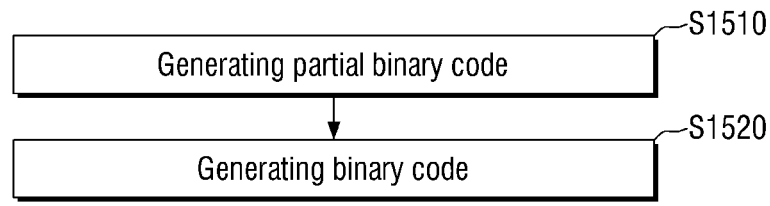
FIG. 37 is a flowchart specifically illustrating generating a binary code of FIG. 34.

FIG. 34 is a flowchart illustrating a method of compiling a neural processing device, according to some embodiments of the disclosure, and FIG. 35 is a flowchart specifically illustrating the storing of FIG. 34. FIG. 36 is a flowchart specifically illustrating the scheduling of the storing of FIG. 35, and FIG. 37 is a flowchart specifically illustrating generating a binary code of FIG. 34.

Referring to FIG. 34, the L2 scheduler 23100 may receive a deep learning graph generated in a deep learning framework at S1100.

Specifically, referring to FIG. 25, the DL framework 10000 may indicate a framework for a deep learning model network used by a user. For example, a trained neural network, that is, a deep learning graph, may be generated by using a program, such as TensorFlow or PyTorch. The deep learning graph may be represented in the form of codes of an calculation task.

Referring again to FIG. 34, the CGRA compiler CGcp may store an calculation code through CGRA compilation in a compute library at S1200.

In detail, referring to FIG. 35, CE dimension determiner 26000 may determine a dimension of a CGRA engine at S1210.

Specifically, referring to FIG. 26, the CE dimension determiner 26000 may determine a scale, that is, a dimension, of the CGRA engine 111 according to an input calculation task. That is, the CE dimension determiner 26000 may determine the number of the first type of the plurality of processing elements 111_3a and the number of the second type of the plurality of processing elements 111_3b included in the CGRA engine 111 to perform an optimal calculation task.

Furthermore, the CE dimension determiner 26000 may also determine the number of CGRA engines 111 included in the one of the CGRA engine groups 110. That is, the dimension of the CGRA engine 111 and the dimension of the one of the CGRA engine groups 110 may be determined, and accordingly, a unit structure and a cluster structure of a final hierarchical structure may be determined.

Referring again to FIG. 35, the CE scheduler 27000 may perform CGRA engine level scheduling at S1220.

Referring to FIG. 36 in detail, the CFG generating module 27100 may generate a CFG at S1221.

Specifically, referring to FIG. 27, the CFG generating module 27100 may receive a deep learning graph from the deep learning DL framework 10000. The deep learning graph may be represented in the form of code written by a DL framework. The CFG generating module 27100 may convert the deep learning graph into a CFG composed of nodes and edges of operation units. The CFG may include a loop that is repeatedly processed a specified number of times or may include a conditional branch structure that branches according to conditions.

Referring again to FIG. 36, CFG unrolling may be performed at S1222.

Specifically, referring to FIG. 27, the unrolling module 27200 may unroll a loop included in the CFG. Additionally, the unrolling module 27200 may perform loop peeling, and loop flattening and inlining. The unrolling module 27200 may generate the unrolling control flow graph UCFG by unrolling the loop included in the CFG.

Referring again to FIG. 36, a hyperblock may be generated at S1223.

Specifically, referring to FIG. 27, the hyperblocking module 27300 may generate a hyperblock by receiving the unrolling control flow graph UCFG and reconstructing a conditional branch structure. The hyperblock may be generated by merging blocks with the same condition among different blocks. The hyperblocking module 27300 may generate the hyperblocking control flow graph HCFG.

Referring again to FIG. 36, CGRA engine level scheduling according to preset hardware constraint may be performed at S1224. Next, a calculation code may be generated at S1225.

Specifically, referring to FIG. 27, the constraint module 27500 may store the hardware constraint Cst generated based on knowledge previously written by an expert. The hardware constraint Cst may be previously designed about how to implement when a certain operation is optimized. That is, the hardware constraint may act as a guideline on how to reconfigure the CGRA engine 111 when a certain input operation is performed.

The scheduling module 27400 may receive the hyper-blocking CFG (HCFG) and receive the hardware constraint Cst. The scheduling module 27400 may generate the hyper-blocking control flow graph HCFG by converting the hyper-blocking control flow graph HCFG into the calculation code SC based on the hardware constraint Cst. The CGRA compiler CGep may store calculation codes in the compute library 22000 through CGRA engine level compilation.

Referring again to FIG. 34, the frontend compiler 23000 may optimize a deep learning graph to generate IR at S1300.

Specifically, referring to FIG. 25, the frontend compiler 23000 may convert various neural network models and graphs transmitted from the adaptation layer 21000 into a constant IR. The converted IR may be a preset representation that is easily handled by the backend compiler 24000 later.

Referring again to FIG. 34, the L2 scheduler 23100 may perform L2 level scheduling according to IR at S1400.

Referring to FIG. 29, the L2 scheduler 23100 may perform L2 level scheduling, that is, CGRA engine group level scheduling. That is, the L2 scheduler 23100 may receive the deep learning graph and tile the calculation task, thereby performing scheduling at levels of the CGRA engine cluster 100 and the one of the CGRA engine groups 110. In the embodiment, there may be both the CGRA engine level scheduling and the CGRA engine group level scheduling, and accordingly, optimization efficiency may be maximized.

Referring again to FIG. 34, the code generator 24100 may generate a binary code according to the compute library at S1500.

In detail, referring to FIG. 37, partial binary codes may be generated at S1510.

Referring to FIG. 30, the code generator 24100 may refer to the compute library 22000. The code generator 24100 may generate a partial binary code based on the calculation code SC stored in the compute library 22000. The partial binary code may be a code that is added later to configure a binary code. Since the calculation code SC is stored based on an operation, the partial binary code may also be generated based on the operation.

Referring again to FIG. 37, a binary code may be generated at S1520.

Referring to FIG. 30, the CE code generator 24200 may receive the partial binary code. The CE code generator 24200 may generate a final binary code by summing several partial binary codes. The CE code generator 24200 may transmit the binary codes to the runtime driver 25000.

Hereinafter, various aspects of the disclosure will be described according to some embodiments.

According to some aspects of the disclosure, a neural processing device comprises: a first coarse-grained reconfigurable architecture (CGRA) engine group and a second CGRA engine group; an L2 memory shared by the first CGRA engine group and the second CGRA engine group; an L2 interconnection configured to transmit data between the L2 memory, the first CGRA engine group, and the second CGRA engine group; and a sequencer configure to provide a hardware resource individually to the first CGRA engine group and the second CGRA engine group, wherein the first CGRA engine group comprises: at least one first CGRA engine; a first L1 memory shared by the at least one first CGRA engine; and a first L1 interconnection configured to transmit data between the first L1 memory and the at least one first CGRA engine.

According to some aspects, the sequencer receives monitoring information on at least one of the at least one first CGRA engine, the L2 interconnection, or the L2 memory, and individually provides the hardware resource according to the monitoring information.

According to some aspects, latency sensitivity of the first L1 interconnection is higher than latency sensitivity of the L2 interconnection.

According to some aspects, a bandwidth of the L2 interconnection is greater than a bandwidth of the first L1 interconnection.

According to some aspects, the neural processing device, further comprises: a first CGRA engine cluster including the first CGRA engine group, the second CGRA engine group and a local interconnection between the first CGRA engine group and the second CGRA engine group.

According to some aspects, the neural processing device, further comprises: a second CGRA engine cluster different from the first CGRA engine cluster, wherein the second CGRA engine cluster includes a third CGRA engine group different from the first CGRA engine group and the second CGRA engine group, and the sequencer includes a first sequencer managing the first CGRA engine cluster and a second sequencer managing the second CGRA engine cluster.

According to some aspects, the sequencer comprises: at least one first lower sequencer managing each of the at least one first CGRA engine; and at least one second lower sequencer managing each of the at least one second CGRA engine.

According to some aspects, the first CGRA engine cluster includes a fourth CGRA engine group different from the first CGRA engine group and the second CGRA engine group, the first CGRA engine group and the second CGRA engine group belong to a first region, the fourth CGRA engine group belongs to a second region, and the sequencer includes a third sequencer managing the first CGRA engine group and the second CGRA engine group, and a fourth sequencer managing the fourth CGRA engine group.

According to some aspects, each of the at least one first CGRA engine has a CGRA structure.

According to some aspects, the at least one first CGRA engine comprises: a PE array including a plurality of processing elements; at least one L0 memory storing input data input to the processing elements and output data output from the processing elements; and at least one instruction memory providing an instruction for an operation of the processing elements.

According to some aspects, the PE array further includes at least one specific processing element different from the processing elements.

According to some aspects, the first CGRA engine group and the second CGRA engine group perform deep learning calculation tasks.

According to some aspects, a compiler stack implemented by the first CGRA engine group and the second CGRA engine group comprises: a CGRA compiler configured to compile operations of the at least one first CGRA engine; and a main compiler configured to compile operations of the L2 memory, the L2 interconnection and at least one of the first CGRA engine group or the second CGRA engine group, According to some aspects, the main compiler comprises: a compute library configured to store a preset calculation code; an adaptation layer configured to quantize a deep learning graph to generate a quantization model; a frontend compiler configured to receive the quantization model and convert the quantization model into intermediate representation (IR); and a backend compiler configured to convert the IR into a binary code by referring to the calculation code.

According to some aspects, the CGRA compiler determines a dimension of the at least one first CGRA engine, and performs, on a circuit, optimization scheduling of the at least first CGRA engine.

According to some aspects, the CGRA compiler determines a dimension of the at least one first CGRA engine, and performs, on a circuit, optimization scheduling of the at least first CGRA engine.

According to some aspects of the disclosure, a neural processing device comprises: at least one first CGRA engine including a PE array including a plurality of processing elements, at least one L0 memory configured to store data for the PE array, at least one instruction memory configured to provide instructions for operating the plurality of processing elements, and at least one load/store unit (LSU) configured to perform load and store for the data; a first L1 memory shared by the at least one first CGRA engine; and a first L1 interconnection configured to transmit data between the first L1 memory and the at least one first CGRA engine.

According to some aspects, the at least one first CGRA engine is managed by a sequencer, and the sequencer provides a hardware resource individually to the at least one first CGRA engine according to importance.

According to some aspects, the at least first CGRA engine is included in a first CGRA engine group, the sequencer manages at least one second CGRA engine, and the at least one second CGRA engine is included in a second CGRA engine group different from the first CGRA engine group.

According to some aspects, the sequencer comprises: an upper sequencer managing the first CGRA engine group; a first lower sequencer associated with the upper sequencer and configured to control the at least one first CGRA engine; and a second lower sequencer associated with the upper sequencer and configured to control the at least one second CGRA engine.

According to some aspects, each of the plurality of processing elements comprises: an instruction queue configured to receive and divide an instruction including precision; and an input formatter and an output formatter configured to perform precision conversion through the precision.

According to some aspects of the disclosure, a processing element in which at least one is included at least one CGRA engine included in a CGRA engine group individually provided with hardware resources by a sequencer, the processing element comprising: an instruction queue configured to receive an instruction set architecture including precision, at least one source, an opcode, and a destination; a first register configured to receive the at least one source and the precision from the instruction queue; an input formatter configured to determine an operand through the first register and configured to perform precision conversion; a second register configured to receive the opcode from the instruction queue and configured to determine an operator; and a third register configured to receive the destination and the precision from the instruction queue.

According to some aspects, the processing element, further comprises an output formatter configured to perform the precision conversion of an output according to the operator of the operand through the third register.

According to some aspects, the input formatter receives the output in bypass by the output formatter.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A processing device comprising processing circuitry comprising:
a plurality of processing engine groups;
a first memory shared by the plurality of engine groups; and
a first interconnection configured to transmit data between the first memory and the plurality of processing engine groups, wherein the processing circuitry is configured to provide hardware resource to the plurality of processing engine groups, at least one of the plurality of processing engine groups comprises:
a plurality of processing engines, each of the plurality of processing engines comprising an array of a plurality of processing elements;
a second memory shared by the plurality of processing engines;
a second interconnection configured to transmit data between the second memory and the plurality of processing engines; and
a compiler stack, wherein the compiler stack comprises:
a compute library configured to store a preset calculation code;
an adaptation layer configured to quantize a deep learning graph to generate a quantization model;
a frontend compiler configured to receive the quantization model and convert the quantization model into intermediate representation (IR);
a backend compiler configured to convert the IR into a binary code by referring to the calculation code; and
wherein the compiler stack is further configured to perform, on a circuit, optimization scheduling of the plurality of processing engines, wherein the performing the optimization scheduling comprises:
generating a control-flow graph (CFG) according to the deep learning graph;
unrolling a loop of the CFG to generate an unrolling CFG;
generating a hyperblock of the unrolling CFG to generate a hyperblocking CFG; and
generating a calculation code at a processing engine level by scheduling the hyperblocking CFG.

2. The processing device of claim 1, wherein the processing circuitry is configured to perform monitoring at least one of the plurality of processing engines, the first interconnection, or the first memory, and individually provides the hardware resource according to a monitoring.

3. The processing device of claim 1, wherein latency sensitivity of the second interconnection is higher than latency sensitivity of the first interconnection.

4. The processing device of claim 1, wherein a bandwidth of the first interconnection is greater than a bandwidth of the second interconnection.

5. The processing device of claim 1, further comprising a first processing engine cluster, and
wherein the first processing engine cluster comprises:
a first set of processing engine groups among the plurality of processing engine groups; and
a local interconnection between the first set of processing engine groups.

6. The processing device of claim 5, further comprising a second processing engine cluster, comprising a second set of processing engine groups among the plurality of processing engine groups, and
wherein a processing engine group of the second set of processing engine groups is different from a processing engine group of the first set of processing engine groups, and
wherein the first processing engine cluster and the second processing engine cluster are managed by separate modules.

7. The processing device of claim 6, wherein the plurality of processing engine groups are managed by separate modules.

8. The processing device of claim 1, further comprising a first processing engine cluster, comprising at least one processing engine group belonging to a first region and at least one processing engine group belonging to a second region,
wherein the at least one processing engine group belonging to the first region and the at least one processing engine group belonging to the second region are managed by separate modules.

9. The processing device of claim 1, wherein the each of the plurality of processing engines further comprises:
at least one third memory storing input data input to the processing elements and output data output from the processing elements; and
at least one fourth memory providing an instruction for an operation of the processing elements.

10. The processing device of claim 1, wherein the compiler stack further comprises:
a first compiler configured to compile operations of the plurality of processing engines; and
a second compiler configured to compile operations of the first memory, the first interconnection, and at least one of the plurality of processing engine groups.

11. The processing device of claim 10, wherein
the first compiler is further configured to determine a dimension of the plurality of processing engines, and perform, on a circuit, the optimization scheduling of the plurality of processing engines.

12. A processing device comprising processing circuitry comprising:
a plurality of processing engines, each of the plurality of processing engine including a processing element (PE) array of a plurality of processing elements, at least one first memory configured to store data for the PE array, at least one second memory configured to provide instructions for operating the plurality of processing elements, and at least one load/store unit (LSU) configured to perform load and store for the data;
a third memory shared by the plurality of processing engines;
an interconnection configured to transmit data between the third memory and the plurality of processing engines; and
a compiler stack,
wherein the compiler stack comprises:
a compute library configured to store a preset calculation code;
an adaptation layer configured to quantize a deep learning graph to generate a quantization model;
a frontend compiler configured to receive the quantization model and convert the quantization model into intermediate representation (IR); and
a backend compiler configured to convert the IR into a binary code by referring to the calculation code,
wherein the compiler stack is further configured to perform, on a circuit, optimization scheduling of the plurality of processing engines, wherein the performing the optimization scheduling comprises:
generating a control-flow graph (CFG) according to the deep learning graph;
unrolling a loop of the CFG to generate an unrolling CFG;
generating a hyperblock of the unrolling CFG to generate a hyperblocking CFG; and
generating a calculation code at a processing engine level by scheduling the hyperblocking CFG.

13. The processing device of claim 12, wherein
the processing circuitry is configured to provide a hardware resource to the plurality of processing engines according to importance of operations performed by the plurality of processing engines.

14. The processing device of claim 13, wherein
a first set of processing engines are included in a first processing engine group, and
a second set of processing engines are included in a second processing engine group.

15. The processing device of claim 14, wherein
the first processing group is managed by an upper module;
a first subset of processing engines in the first processing engine group is managed by a first lower module associated with the upper module; and
a second subset of processing engine in the first processing engine group is managed by a second lower module associated with the upper module.

16. The processing device of claim 12, wherein each of the plurality of processing elements comprises:
an instruction queue configured to receive and divide an instruction including precision; and
an input formatter and an output formatter configured to perform precision conversion through the precision.

17. A processing device comprising processing circuitry comprising:
at least one processing engine group comprising a plurality of processing engines; and
a compiler stack comprising a compute library configured to store a preset calculation code, an adaptation layer configured to quantize a deep learning graph to generate a quantization model, a frontend compiler configured to receive the quantization model and convert the quantization model into intermediate representation (IR), and a backend compiler configured to convert the IR into a binary code by referring to the calculation code,
wherein at least one of the plurality of processing engines comprises a plurality of processing elements,
the processing circuitry is configured to provide the plurality of processing engines with hardware resources,
wherein at least one of the plurality of processing elements comprises:
an instruction queue configured to receive an instruction including precision, a source, an opcode, and a destination;

a first register configured to receive the source and the precision from the instruction queue;

an input formatter configured to determine an operand through the first register and configured to perform precision conversion;

a second register configured to receive the opcode from the instruction queue and configured to determine an operator; and a third register configured to receive the destination and the precision from the instruction queue, wherein the compiler stack is further configured to perform, on a circuit, optimization scheduling of the plurality of processing engines, wherein the performing the optimization scheduling comprises:

generating a control-flow graph (CFG) according to the deep learning graph;

unrolling a loop of the CFG to generate an unrolling CFG;

generating a hyperblock of the unrolling CFG to generate a hyperblocking CFG; and generating a calculation code at a processing engine level by scheduling the hyperblocking CFG.

18. The processing device of claim 17, further comprising an output formatter configured to perform the precision conversion of an output according to the operator of the operand through the third register.

19. The processing device of claim 18, wherein the input formatter receives the output in bypass by the output formatter.

* * * * *